US012675070B2

(12) United States Patent (10) Patent No.: US 12,675,070 B2
Suzuki et al. (45) Date of Patent: Jul. 7, 2026

(54) IMAGE FORMING SYSTEM, DIAGNOSTIC APPARATUS, AND IMAGE FORMING APPARATUS

(71) Applicant: CANON KABUSHIKI KAISHA, Tokyo (JP)

(72) Inventors: Yohei Suzuki, Shizuoka (JP); Seiji Hara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/915,452

(22) Filed: Oct. 15, 2024

(65) Prior Publication Data

US 2025/0138463 A1 May 1, 2025

(30) Foreign Application Priority Data

Oct. 27, 2023 (JP) ................................ 2023-185012

(51) Int. Cl.
*G03G 15/00* (2006.01)
*H04N 1/00* (2006.01)
(52) U.S. Cl.
CPC ......... *G03G 15/55* (2013.01); *G03G 15/5016* (2013.01); *G03G 15/5062* (2013.01);
(Continued)
(58) Field of Classification Search
CPC ............. G03G 15/5016; G03G 15/502; G03G 15/5062; G03G 15/5079; G03G 15/55;
(Continued)

(56) References Cited

U.S. PATENT DOCUMENTS

2005/0262394 A1* 11/2005 Yasukawa ........... G06F 11/0748
714/E11.026
2007/0070456 A1* 3/2007 Nishimura ......... H04N 1/00037
358/504
(Continued)

FOREIGN PATENT DOCUMENTS

JP 2009042691 A 2/2009
JP 2016014818 A 1/2016
(Continued)

OTHER PUBLICATIONS

Extended European Search Report dated Mar. 10, 2025 in counterpart European Patent Appln. No. 24205167.0.

*Primary Examiner* — Carla J Therrien
(74) *Attorney, Agent, or Firm* — Venable LLP

(57) ABSTRACT

The server includes: an identification unit configured to identify that a location of a defect is in a first range including a plurality of replaceable components in an image forming apparatus, and in a case where it is possible to identify that the location of the defect is in a second range included in the first range, further identify the second range; and a reporting unit configured to, in a case where the identification unit identifies the second range, report to a display apparatus such that the display apparatus displays information indicating the second range, and in a case where the identification unit does not identify the second range, report to the display apparatus such that the display apparatus displays information indicating the first range.

21 Claims, 19 Drawing Sheets

(52) U.S. Cl.
CPC ..... *G03G 15/5079* (2013.01); *H04N 1/00015*
(2013.01); *H04N 1/00039* (2013.01); *H04N*
*1/00042* (2013.01); *H04N 1/00061* (2013.01);
*H04N 1/00074* (2013.01); *G03G 2215/00637*
(2013.01)

(58) Field of Classification Search
CPC .............. G03G 15/553; G03G 15/556; G03G
2215/00637; G06F 3/1234; H04N
1/00015; H04N 1/00039; H04N 1/00042;
H04N 1/00061; H04N 1/00074
See application file for complete search history.

(56) References Cited

U.S. PATENT DOCUMENTS

| | | |
|---|---|---|
| 2007/0280706 A1 | 12/2007 | Yasukawa |
| 2009/0041481 A1* | 2/2009 | Iida .................... G03G 15/5079 |
| | | 399/12 |
| 2011/0228307 A1 | 9/2011 | Kott |
| 2018/0232271 A1 | 8/2018 | Wakabayashi |
| 2023/0300258 A1 | 9/2023 | Suzuki |
| 2024/0118652 A1* | 4/2024 | Tsunoda ............. G03G 15/5016 |

FOREIGN PATENT DOCUMENTS

| | | |
|---|---|---|
| JP | 2019174617 A | 10/2019 |
| JP | 2020122701 A | 8/2020 |
| JP | 2020173376 A | 10/2020 |

* cited by examiner

Figure 4:
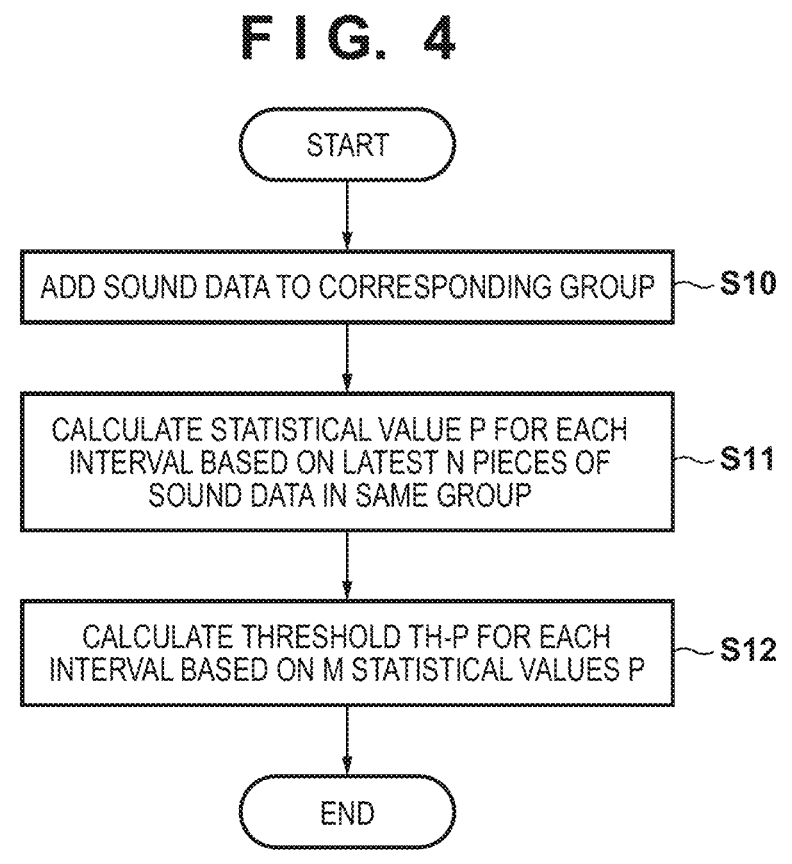

```
          ┌─────────────┐
          │    START    │
          └─────────────┘
                 │
                 ▼
┌──────────────────────────────────────────┐
│  ADD SOUND DATA TO CORRESPONDING GROUP    │─── S10
└──────────────────────────────────────────┘
                 │
                 ▼
┌──────────────────────────────────────────┐
│  CALCULATE STATISTICAL VALUE P FOR EACH   │
│    INTERVAL BASED ON LATEST N PIECES OF   │─── S11
│         SOUND DATA IN SAME GROUP          │
└──────────────────────────────────────────┘
                 │
                 ▼
┌──────────────────────────────────────────┐
│    CALCULATE THRESHOLD TH-P FOR EACH      │
│  INTERVAL BASED ON M STATISTICAL VALUES P │─── S12
└──────────────────────────────────────────┘
                 │
                 ▼
          ┌─────────────┐
          │     END     │
          └─────────────┘
```

F I G. 5A

| TIME INTERVAL | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| SOUND WAVE LEVEL L | 4364 | 3937 | 3905 | 3813 | 3781 | 3784 | 5296 | 3855 | 3616 | 3675 | 3257 | 3252 | 3256 | 3239 | 2940 | 2818 |
| FEED MOTOR | 1 | 1 | 1 | 0 | 0 | 0 | 0 | 0 | 0 | 0 | 0 | 0 | 0 | 0 | 0 | 0 |
| INTERMEDIATE TRANSFER BODY MOTOR | 1 | 1 | 1 | 1 | 1 | 1 | 1 | 1 | 0 | 0 | 0 | 0 | 0 | 0 | 0 | 0 |
| PHOTOSENSITIVE BODY MOTOR | 1 | 1 | 1 | 1 | 1 | 1 | 1 | 1 | 0 | 0 | 0 | 0 | 0 | 0 | 0 | 0 |
| DEVELOPING MOTOR | 1 | 1 | 1 | 1 | 1 | 1 | 1 | 1 | 0 | 0 | 0 | 0 | 0 | 0 | 0 | 0 |
| FIXING MOTOR | 1 | 1 | 1 | 1 | 1 | 1 | 1 | 1 | 1 | 1 | 1 | 1 | 1 | 0 | 0 | 0 |

F I G. 5B

| TIME INTERVAL | #1 | #2 | #3 | #4 | #5 | #6 | #7 | #8 | #9 | #10 | #11 | #12 | #13 | #14 | #15 | #16 |
|---|---|---|---|---|---|---|---|---|---|---|---|---|---|---|---|---|
| SOUND WAVE LEVEL L | 3977 | 3933 | 3895 | 3951 | 3781 | 3784 | 3854 | 5230 | 3873 | 3655 | 3453 | 3289 | 3295 | 2955 | 2984 | 2911 |
| FEED MOTOR | 1 | 1 | 1 | 0 | 0 | 0 | 0 | 0 | 0 | 0 | 0 | 0 | 0 | 0 | 0 | 0 |
| INTERMEDIATE TRANSFER BODY MOTOR | 1 | 1 | 1 | 1 | 1 | 1 | 1 | 1 | 1 | 0 | 0 | 0 | 0 | 0 | 0 | 0 |
| PHOTOSENSITIVE BODY MOTOR | 1 | 1 | 1 | 1 | 1 | 1 | 1 | 1 | 1 | 0 | 0 | 0 | 0 | 0 | 0 | 0 |
| DEVELOPING MOTOR | 1 | 1 | 1 | 1 | 1 | 1 | 1 | 1 | 1 | 0 | 0 | 0 | 0 | 0 | 0 | 0 |
| FIXING MOTOR | 1 | 1 | 1 | 1 | 1 | 1 | 1 | 1 | 1 | 1 | 1 | 1 | 1 | 0 | 0 | 0 |

F I G. 6
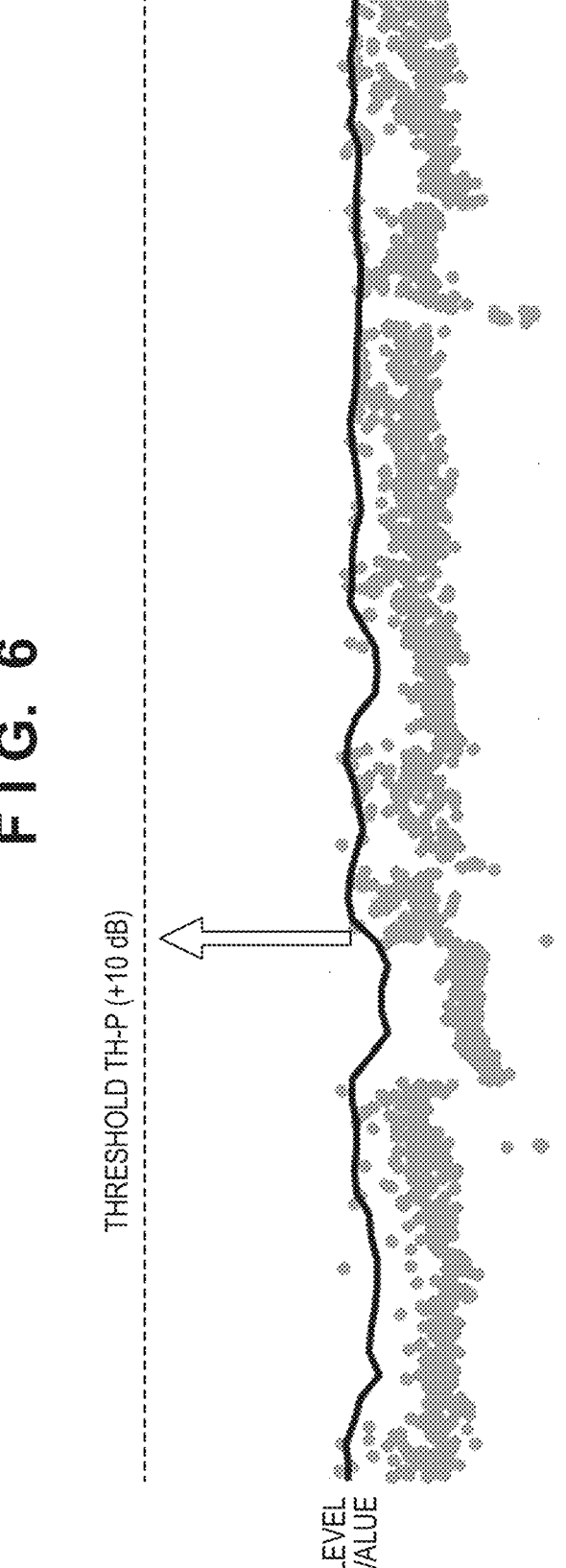

FIG. 7

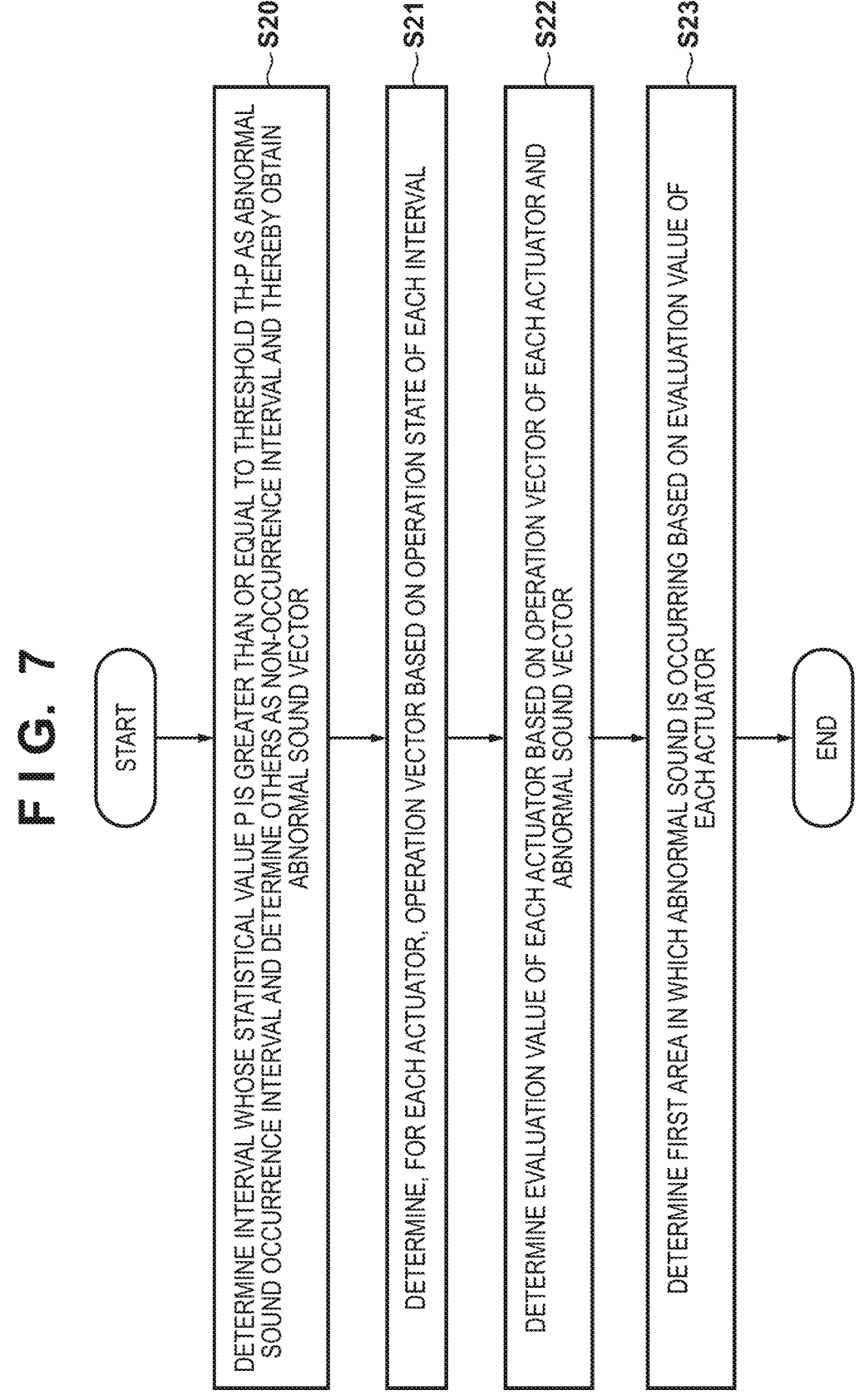

START

S20 DETERMINE INTERVAL WHOSE STATISTICAL VALUE P IS GREATER THAN OR EQUAL TO THRESHOLD TH-P AS ABNORMAL SOUND OCCURRENCE INTERVAL AND DETERMINE OTHERS AS NON-OCCURRENCE INTERVAL AND THEREBY OBTAIN ABNORMAL SOUND VECTOR

S21 DETERMINE, FOR EACH ACTUATOR, OPERATION VECTOR BASED ON OPERATION STATE OF EACH INTERVAL

S22 DETERMINE EVALUATION VALUE OF EACH ACTUATOR BASED ON OPERATION VECTOR OF EACH ACTUATOR AND ABNORMAL SOUND VECTOR

S23 DETERMINE FIRST AREA IN WHICH ABNORMAL SOUND IS OCCURRING BASED ON EVALUATION VALUE OF EACH ACTUATOR

END

FIG. 8

| TIME INTERVAL | #1 | #2 | #3 | #4 | #5 | #6 | #7 | #8 | #9 | #10 | #11 | #12 | #13 | #14 | #15 | #16 | EVALUATION VALUE |
|---|---|---|---|---|---|---|---|---|---|---|---|---|---|---|---|---|---|
| DETERMINATION RESULT | 1 | 1 | 1 | 1 | 1 | 1 | 1 | 1 | 1 | 1 | 1 | 1 | 1 | 0 | 0 | 0 | |
| FEED MOTOR | 1 | 1 | 1 | 0 | 0 | 0 | 0 | 0 | 0 | 0 | 0 | 0 | 0 | 0 | 0 | 0 | 0.48 |
| INTERMEDIATE TRANSFER BODY MOTOR | 1 | 1 | 1 | 1 | 1 | 1 | 1 | 1 | 0 | 0 | 0 | 0 | 0 | 0 | 0 | 0 | 0.78 |
| PHOTOSENSITIVE BODY MOTOR | 1 | 1 | 1 | 1 | 1 | 1 | 1 | 1 | 0 | 0 | 0 | 0 | 0 | 0 | 0 | 0 | 0.78 |
| DEVELOPING MOTOR | 1 | 1 | 1 | 1 | 1 | 1 | 1 | 1 | 0 | 0 | 0 | 0 | 0 | 0 | 0 | 0 | 0.78 |
| FIXING MOTOR | 1 | 1 | 1 | 1 | 1 | 1 | 1 | 1 | 1 | 1 | 1 | 1 | 1 | 0 | 0 | 0 | 1 |

F I G. 9

| ACTUATOR | AREA | UNIT |
|---|---|---|
| FEED MOTOR | FEED AREA | REGISTRATION UNIT 25 |
| | | FEED DRIVING UNIT |
| INTERMEDIATE TRANSFER BODY MOTOR | IMAGE FORMING AREA | INTERMEDIATE TRANSFER UNIT 11 |
| PHOTOSENSITIVE BODY MOTOR | | CARTRIDGES 5 |
| DEVELOPING MOTOR | | IMAGE FORMING DRIVING UNIT |
| FIXING MOTOR | FIXING AREA | FIXING UNIT 30 |
| | | DISCHARGE UNIT 40 |
| | | FIXING DRIVING UNIT |

F I G. 10

| No | FIRST AREA | FILTER | EVALUATION VALUE | CAUSAL UNIT |
|---|---|---|---|---|
| 1 | FIXING AREA | HIGH PASS | GREATER THAN OR EQUAL TO 0.9 | DISCHARGE UNIT |
| | | LOW PASS | LESS THAN 0.9 | |
| 2 | FIXING AREA | HIGH PASS | GREATER THAN OR EQUAL TO 0.9 | FIXING DRIVING UNIT |
| | | LOW PASS | GREATER THAN OR EQUAL TO 0.9 | |
| ... | | | | |

F I G. 11
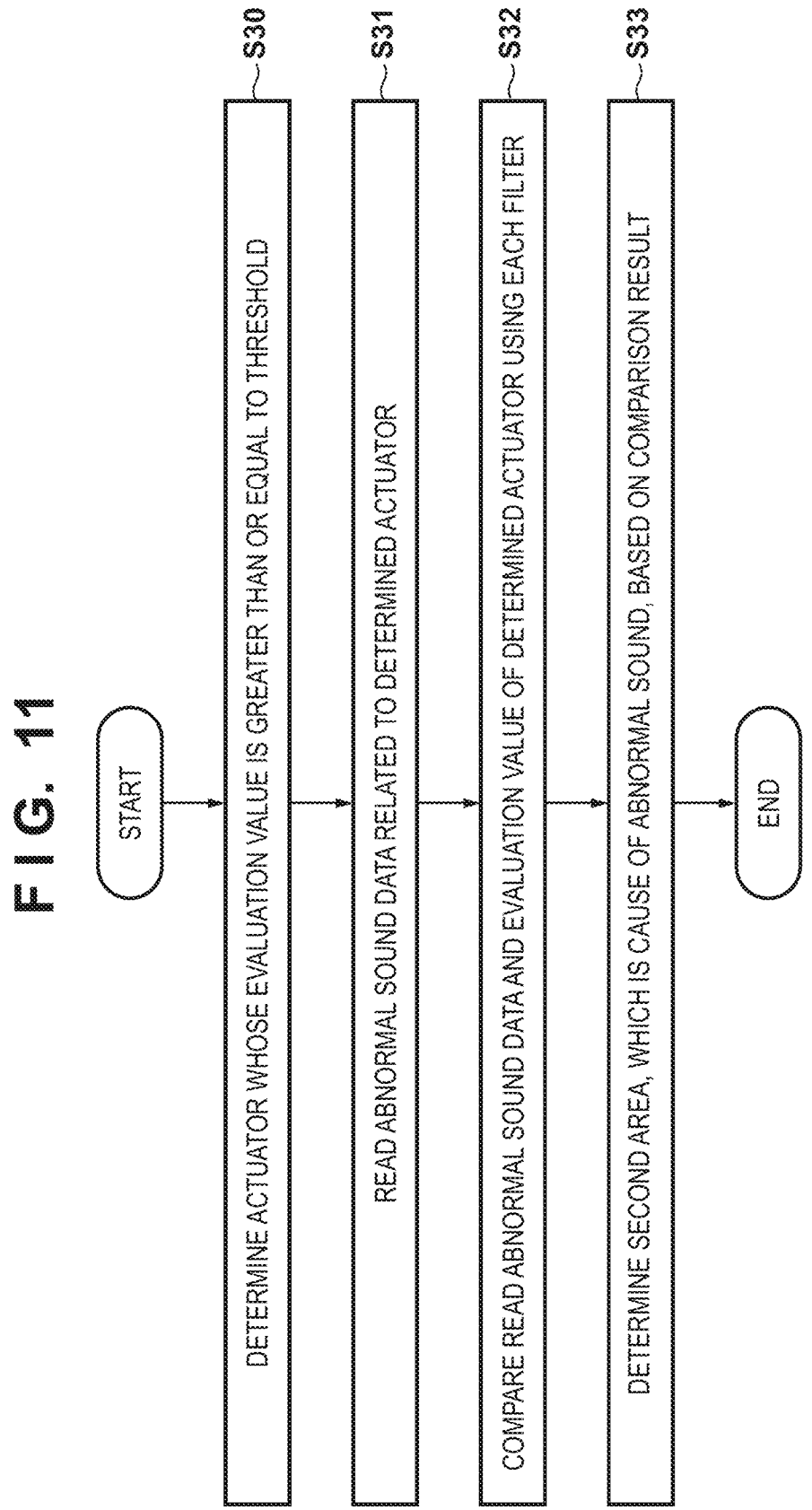
START
S30 DETERMINE ACTUATOR WHOSE EVALUATION VALUE IS GREATER THAN OR EQUAL TO THRESHOLD
S31 READ ABNORMAL SOUND DATA RELATED TO DETERMINED ACTUATOR
S32 COMPARE READ ABNORMAL SOUND DATA AND EVALUATION VALUE OF DETERMINED ACTUATOR USING EACH FILTER
S33 DETERMINE SECOND AREA, WHICH IS CAUSE OF ABNORMAL SOUND, BASED ON COMPARISON RESULT
END

F I G. 12A

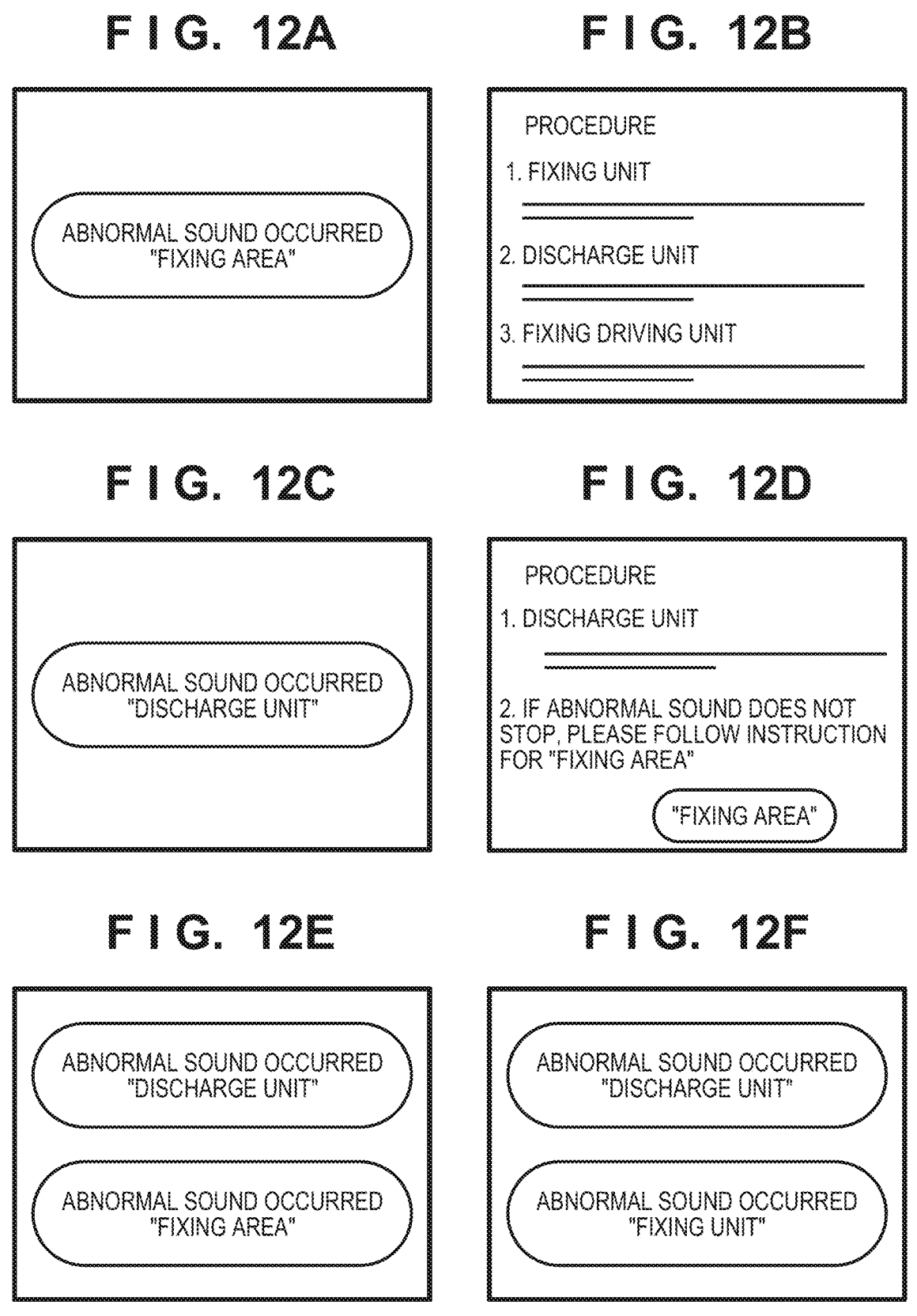

ABNORMAL SOUND OCCURRED
"FIXING AREA"

F I G. 12B

PROCEDURE

1. FIXING UNIT
   _____
   _____

2. DISCHARGE UNIT
   _____
   _____

3. FIXING DRIVING UNIT
   _____
   _____

F I G. 12C

ABNORMAL SOUND OCCURRED
"DISCHARGE UNIT"

F I G. 12D

PROCEDURE

1. DISCHARGE UNIT
   _____
   _____

2. IF ABNORMAL SOUND DOES NOT
   STOP, PLEASE FOLLOW INSTRUCTION
   FOR "FIXING AREA"

"FIXING AREA"

F I G. 12E

ABNORMAL SOUND OCCURRED
"DISCHARGE UNIT"

ABNORMAL SOUND OCCURRED
"FIXING AREA"

F I G. 12F

ABNORMAL SOUND OCCURRED
"DISCHARGE UNIT"

ABNORMAL SOUND OCCURRED
"FIXING UNIT"

F I G. 14

CONVEYANCE DIRECTION

C1    C2    C3    E    S

XXXXXXXXXXXXXXXXXXXX

U

12 DOTS

12 DOTS

|   | 1 | 2 | 3 | 4 | 5 | 6 | 7 | 8 | 9 | 10 | 11 | 12 |
|---|---|---|---|---|---|---|---|---|---|----|----|----|
| 1 | 2 | 6 | 8 | 3 | 5 | 0 | 0 | 6 | 7 | 7 | 7 | 2 |
| 2 | 1 | 4 | 0 | 7 | 4 | 2 | 0 | 3 | 5 | 4 | 3 | 5 |
| 3 | 0 | 2 | 3 | 7 | 1 | 5 | 2 | 4 | 8 | 9 | 1 | 5 |
| 4 | 7 | 4 | 1 | 1 | 3 | 1 | 5 | 2 | 6 | 7 | 2 | 6 |
| 5 | 5 | 2 | 4 | 4 | 7 | 0 | 4 | 3 | 3 | 4 | 2 | 8 |
| 6 | 1 | 1 | 2 | 6 | 8 | 5 | 1 | 5 | 5 | 6 | 0 | 6 |
| 7 | 1 | 5 | 4 | 1 | 0 | 1 | 6 | 3 | 1 | 6 | 5 | 0 |
| 8 | 0 | 9 | 1 | 3 | 4 | 0 | 0 | 5 | 6 | 1 | 8 | 0 |
| 9 | 6 | 4 | 6 | 0 | 2 | 3 | 6 | 4 | 2 | 6 | 3 | 7 |
| 10 | 8 | 7 | 1 | 7 | 0 | 2 | 6 | 1 | 6 | 1 | 7 | 4 |
| 11 | 0 | 6 | 5 | 1 | 0 | 4 | 0 | 3 | 7 | 0 | 4 | 8 |
| 12 | 4 | 5 | 5 | 0 | 2 | 6 | 5 | 1 | 3 | 0 | 4 | 8 |

HORIZONTAL CHANGE AMOUNT (HY)

VERTICAL CHANGE AMOUNT (HT)

F I G. 17A
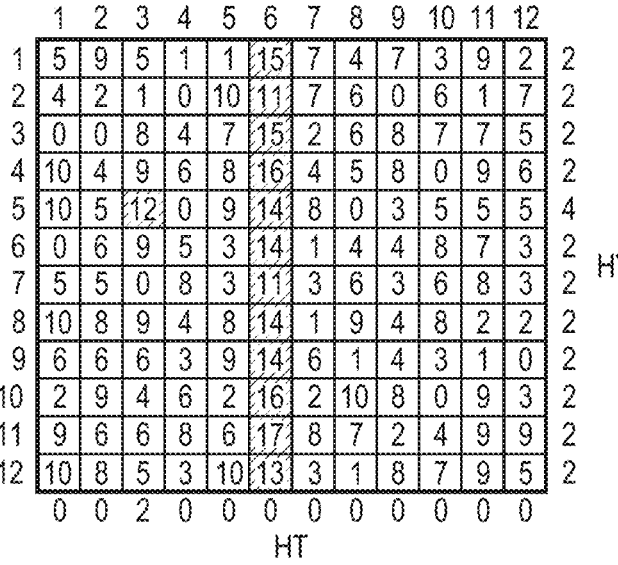
F I G. 17B
F I G. 17C
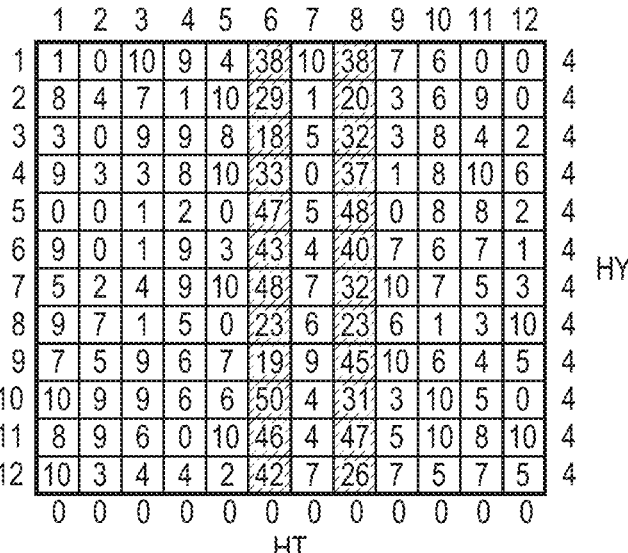

F I G. 18

|  | #1 | #16 | #61 | #79 | #103 |
|---|---|---|---|---|---|
| $\Delta E_{sum}$ | 515 | 860 | 986 | 1497 | 523 |
| $\Sigma HY$ | 4 | 26 | 52 | 48 | 4 |
| $\Sigma HT$ | 4 | 2 | 4 | 0 | 4 |
| RY | 0.5 | 0.93 | 0.93 | 1.00 | 0.5 |
| RI | 258 | 799 | 916 | 1497 | 262 |

FIG. 19A

| | 1 | 2 | 3 | 4 | 5 | 6 | 7 | 8 | 9 | 10 | 11 | 12 |
|---|---|---|---|---|---|---|---|---|---|---|---|---|
| 1 | | | | | | 89.95 | | 86.59 | | | | |
| 2 | | | | | | 89.97 | | 86.46 | | | | |
| 3 | | | | | | 89.85 | | 86.60 | | | | |
| 4 | | | | | | 90.10 | | 86.50 | | | | |
| 5 | | | | | | 90.26 | | 86.49 | | | | |
| 6 | | | | | | 90.02 | | 86.58 | | | | |
| 7 | | | | | | 90.04 | | 86.70 | | | | |
| 8 | | | | | | 89.94 | | 86.44 | | | | |
| 9 | | | | | | 90.02 | | 87.52 | | | | |
| 10 | | | | | | 89.82 | | 87.64 | | | | |
| 11 | | | | | | 89.94 | | 87.70 | | | | |
| 12 | | | | | | 90.58 | | 87.67 | | | | |

L VALUE

FIG. 19B

| | 1 | 2 | 3 | 4 | 5 | 6 | 7 | 8 | 9 | 10 | 11 | 12 |
|---|---|---|---|---|---|---|---|---|---|---|---|---|
| 1 | | | | | | 0.27 | | 6.43 | | | | |
| 2 | | | | | | 0.31 | | 6.52 | | | | |
| 3 | | | | | | 0.25 | | 6.49 | | | | |
| 4 | | | | | | 0.46 | | 6.39 | | | | |
| 5 | | | | | | 0.38 | | 6.53 | | | | |
| 6 | | | | | | 0.57 | | 6.30 | | | | |
| 7 | | | | | | 0.47 | | 6.22 | | | | |
| 8 | | | | | | 0.44 | | 6.50 | | | | |
| 9 | | | | | | 0.26 | | 6.24 | | | | |
| 10 | | | | | | 0.11 | | 6.02 | | | | |
| 11 | | | | | | 0.33 | | 6.20 | | | | |
| 12 | | | | | | 0.82 | | 6.20 | | | | | a VALUE

FIG. 19C

| | 1 | 2 | 3 | 4 | 5 | 6 | 7 | 8 | 9 | 10 | 11 | 12 |
|---|---|---|---|---|---|---|---|---|---|---|---|---|
| 1 | | | | | | −10.82 | | −10.30 | | | | |
| 2 | | | | | | −10.78 | | −10.36 | | | | |
| 3 | | | | | | −10.85 | | −10.15 | | | | |
| 4 | | | | | | −10.64 | | −10.00 | | | | |
| 5 | | | | | | −10.73 | | −10.24 | | | | |
| 6 | | | | | | −10.77 | | −10.14 | | | | |
| 7 | | | | | | −10.74 | | −9.95 | | | | |
| 8 | | | | | | −10.81 | | −10.58 | | | | |
| 9 | | | | | | −10.86 | | −9.89 | | | | |
| 10 | | | | | | −10.93 | | −9.98 | | | | |
| 11 | | | | | | −10.75 | | −9.60 | | | | |
| 12 | | | | | | −10.05 | | −10.11 | | | | | b VALUE

F I G. 20A

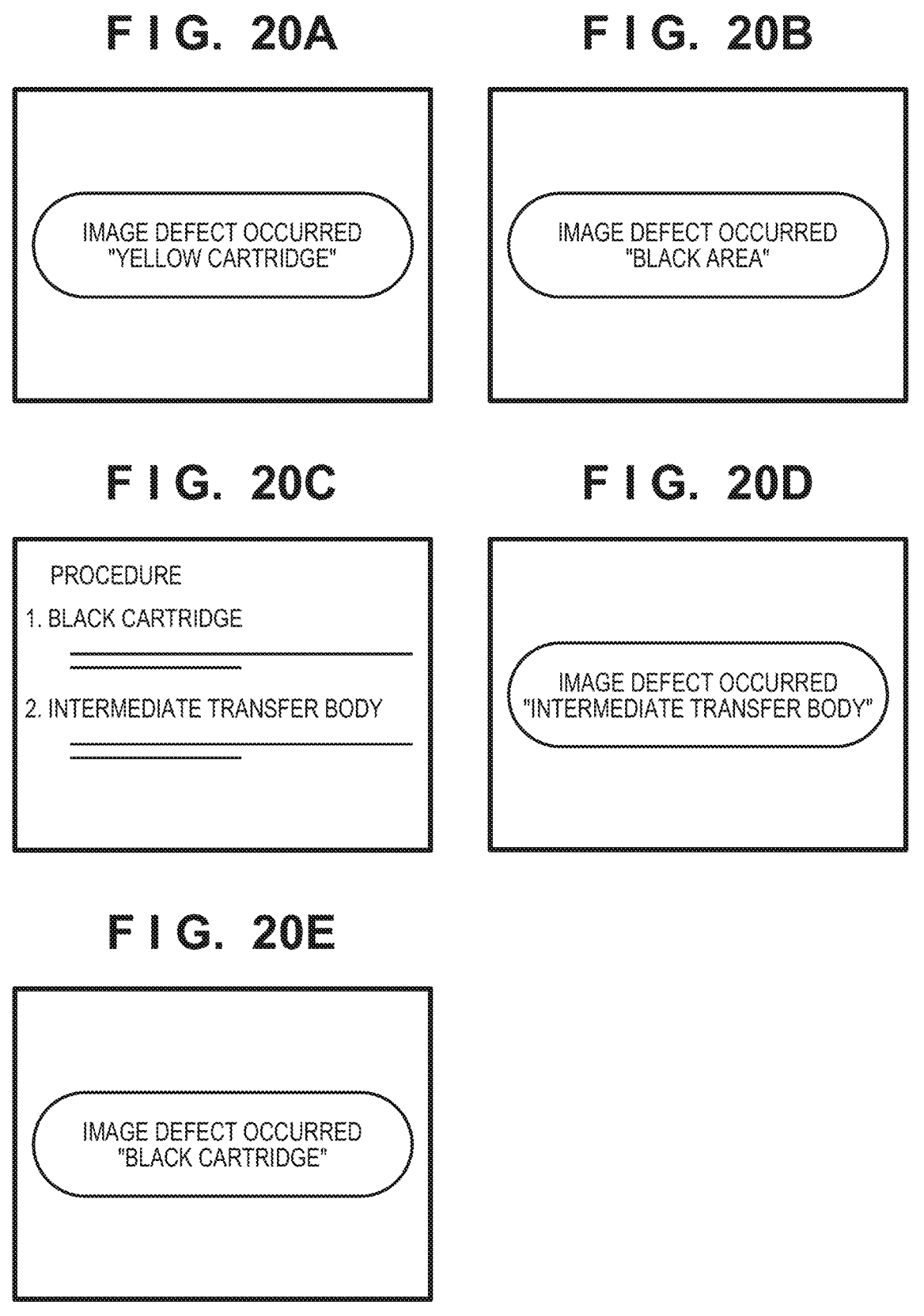

IMAGE DEFECT OCCURRED
"YELLOW CARTRIDGE"

F I G. 20B

IMAGE DEFECT OCCURRED
"BLACK AREA"

F I G. 20C

PROCEDURE

1. BLACK CARTRIDGE

_____

2. INTERMEDIATE TRANSFER BODY

_____

F I G. 20D

IMAGE DEFECT OCCURRED
"INTERMEDIATE TRANSFER BODY"

F I G. 20E

IMAGE DEFECT OCCURRED
"BLACK CARTRIDGE"

IMAGE FORMING SYSTEM, DIAGNOSTIC APPARATUS, AND IMAGE FORMING APPARATUS

BACKGROUND OF THE INVENTION

Field of the Invention

The present invention relates to a technique for diagnosing an image forming apparatus.

Description of the Related Art

Image forming apparatuses such as a copying machine and a laser printer include replaceable components (replaceable units), which are to be replaced according to their lifespan. When replaceable components are used beyond their lifespan, defects such as an image defect and generation of sounds (hereinafter, abnormal sounds) different from normal operation sounds may occur. For example, when a conveyance roller for conveying a sheet is used beyond its lifespan, wear of its surface or the like may cause an abnormal sound to occur. Further, when a cleaning blade for removing toner remaining on a photosensitive body is used beyond its lifespan, damage or deformation thereof or the like may cause a streaky image defect to occur in an image to be formed.

Japanese Patent Laid-Open No. 2016-14818 discloses a configuration in which a sound collector is arranged inside an image forming apparatus and a component generating an abnormal sound is detected by comparison with a known abnormal sound.

Since defects are caused by various factors, even if causal parts are narrowed down to one replaceable component, that result may be wrong. In such a case, the time it takes to resolve the defect may increase. In order to resolve the defect quickly, it is necessary to appropriately report a replaceable component that may be the causal part.

SUMMARY OF THE INVENTION

According to an aspect of the preset invention, an image forming system includes an image forming apparatus and a server capable of communicating with the image forming apparatus. The image forming apparatus includes: a collection unit configured to collect data related to operation of the image forming apparatus; and a transmission unit configured to transmit the data to the server. The server includes: an identification unit configured to detect a defect occurring in the image forming apparatus based on the data, identify that a location of the defect is in a first range, which is a range including a plurality of replaceable components included in the image forming apparatus, based on the data, and in a case where it is possible to identify that the location of the defect is in a second range, which is included in the first range, further identify the second range; and a reporting unit configured to, in a case where the identification unit identifies the second range, report to a display apparatus such that the display apparatus displays information indicating that there is a possibility that the defect is in the second range, and in a case where the identification unit does not identify the second range and identifies the first range, report to the display apparatus such that the display apparatus displays information indicating there is a possibility that the defect is in the first range.

Further features of the present invention will become apparent from the following description of exemplary embodiments with reference to the attached drawings.

BRIEF DESCRIPTION OF THE DRAWINGS

FIG. 2 is a diagram of a configuration of a diagnostic system according to some embodiments.

FIG. 4 is a flowchart of threshold setting processing according to some embodiments.

FIGS. 5A and 5B are diagrams illustrating sound data according to some embodiments.

FIG. 6 is a diagram illustrating a relationship between statistical values and a threshold according to some embodiments.

FIG. 7 is a flowchart of processing for identifying a first area according to some embodiments.

FIG. 8 is a descriptive diagram of processing for identifying a first area according to some embodiments.

FIG. 9 is a diagram illustrating examples of a first area according to some embodiments.

FIG. 10 is a diagram illustrating abnormal sound data according to some embodiments.

FIG. 11 is a flowchart of processing for identifying a second area according to some embodiments.

FIGS. 12A to 12F are diagrams illustrating examples of report contents according to some embodiments.

FIG. 14 is a descriptive diagram of processing for detecting an image defect according to some embodiments.

FIGS. 17A to 17C are descriptive diagrams of processing for detecting an image defect according to some embodiments.

FIG. 18 is a descriptive diagram of processing for detecting an image defect according to some embodiments.

FIGS. 19A to 19C are descriptive diagrams of processing for detecting an image defect according to some embodiments.

FIGS. 20A to 20E are diagrams illustrating examples of report contents according to some embodiments.

DESCRIPTION OF THE EMBODIMENTS

Figure 1:
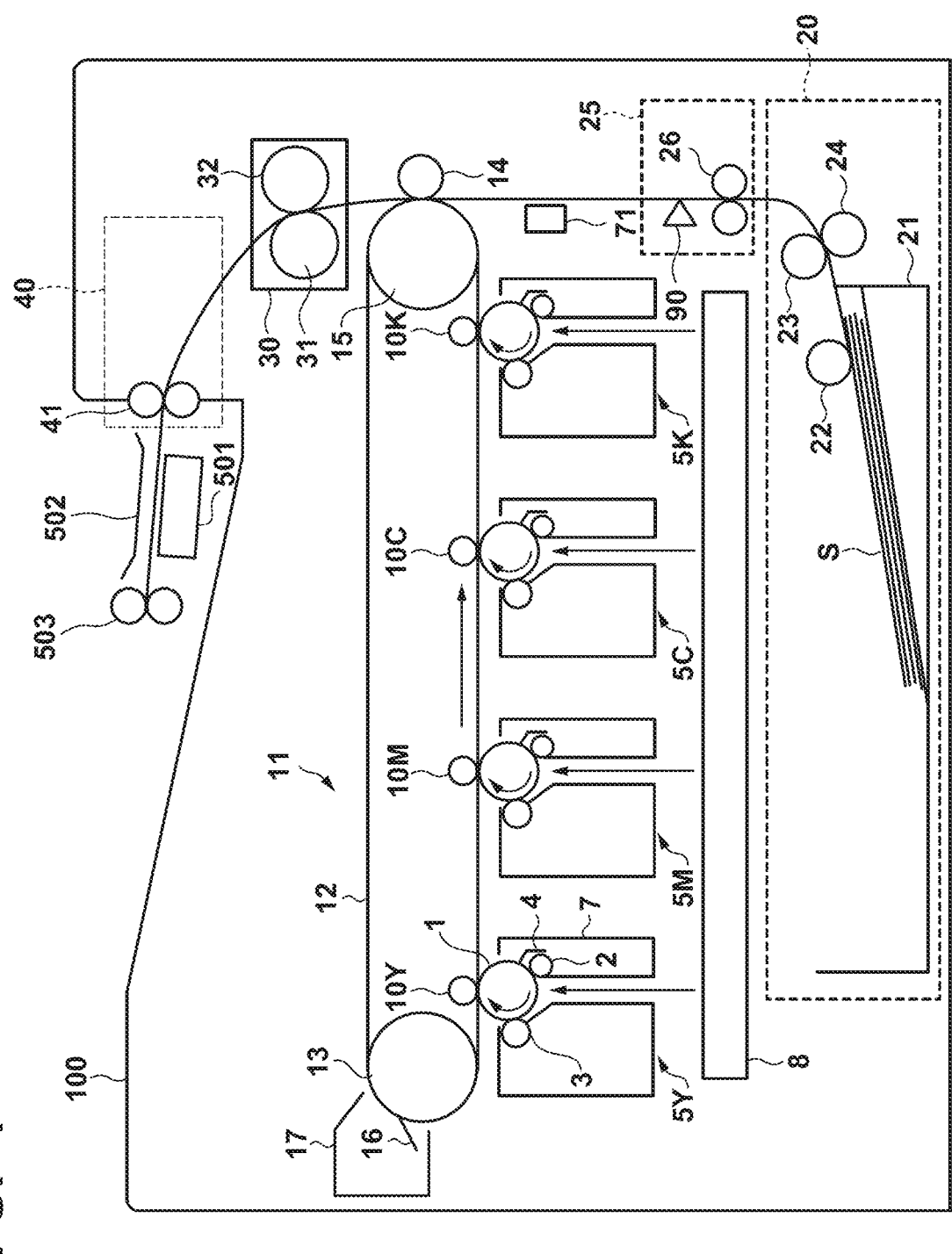
FIG. 1 is a schematic diagram of a configuration of an image forming apparatus according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic diagram of a configuration of an image forming apparatus 100 according to some embodiments. The image forming apparatus 100 includes cartridges 5Y, 5M, 5C and 5K which form yellow, magenta, cyan, and black toner images on an intermediate transfer body 12. The cartridges 5Y, 5M, 5C and 5K are similar in configuration except that the colors of toner that they contain are different and will be collectively referred to as the cartridges 5 below. A cartridge 5 is configured to be capable of being attached to and detached from the main body of the image forming apparatus 100 and includes a photosensitive body 1, a charging roller 2, a developing roller 3, a cleaning blade 4, and a waste toner container 7. An intermediate transfer body unit 11 includes the intermediate transfer body 12, a driving roller 15, a tension roller 13, primary transfer rollers 10Y, 10M, 10C and a 10K, a cleaning blade 16, and a waste toner container 17. At the time of image formation, the photosensitive body 1 of the cartridge 5 is rotationally driven in a clockwise direction of the figure. Further, at the time of image formation, the driving roller 15 is rotationally driven in a counterclockwise direction of the figure. With this, the intermediate transfer body 12 is also rotationally driven in the counterclockwise direction of the figure.

The charging roller 2 charges the surface of the rotationally-driven photosensitive body 1. A scanning unit 8 exposes each photosensitive body 1 based on image data and forms an electrostatic latent image on the photosensitive body 1 of each cartridge 5. The developing roller 3 develops the electrostatic latent image of the photosensitive body 1 with toner and thereby forms a toner image on the photosensitive body 1. The primary transfer rollers 10Y, 10M, 10C and 10K each output a primary transfer voltage and thereby transfer the toner images formed on the photosensitive bodies 1 of the cartridges 5Y, 5M, 5C and 5K to the intermediate transfer body 12. The cleaning blade 4 removes, from the photosensitive body 1, toner not transferred to the intermediate transfer body 12 and remaining on the photosensitive body 1 and collects the toner in the waste toner container 7. The toner images transferred to the intermediate transfer body 12 are conveyed to a position facing a secondary transfer roller 14 by rotation of the intermediate transfer body 12.

Meanwhile, a feed roller 22 of a feed unit 20 feeds a sheet S accommodated in a cassette 21 to a conveyance path of the image forming apparatus 100. A conveyance roller 23 conveys the sheet S fed by the feed roller 22 to a downstream side. A separation roller 24 is provided to prevent double feeding. A registration unit 25 includes registration rollers 26 and a conveyance sensor 90 for detecting the sheet S. The registration rollers 26 convey the sheet S toward a nip region formed by the secondary transfer roller 14 and the intermediate transfer body 12. The secondary transfer roller 14 outputs a secondary transfer voltage and thereby transfers the toner images of the intermediate transfer body 12 to the sheet S. A timing at which the registration rollers 26 feed the sheet S toward the nip region is adjusted based on a timing at which the conveyance sensor 90 detects the sheet S such that the toner images of the intermediate transfer body 12 are transferred to the sheet S. A fixing unit 30 includes a fixing film 31 and a pressing roller 32 and fixes the toner images to the sheet S by heating and pressing the sheet S. After the toner images are fixed, the sheet S is discharged out of the image forming apparatus 100 by discharge rollers 41 of a discharge unit 40. An image reading apparatus 501, a facing guide 502, and discharge rollers 503 of FIG. 1 are not necessary in the present embodiment and may be omitted.

A reception unit 71 for receiving sound waves is provided between the conveyance sensor 90 and the secondary transfer roller 14 in a conveyance direction of a sheet S. The reception unit 71 may include, for example, a Micro Electro Mechanical System (MEMS) microphone, which converts vibrational displacement of a diaphragm due to pressure into a voltage change and outputs the voltage change. A microphone other than the MEMS microphone, such as a condenser microphone, for example, may be used so long as sound waves can be received.

Figure 2:
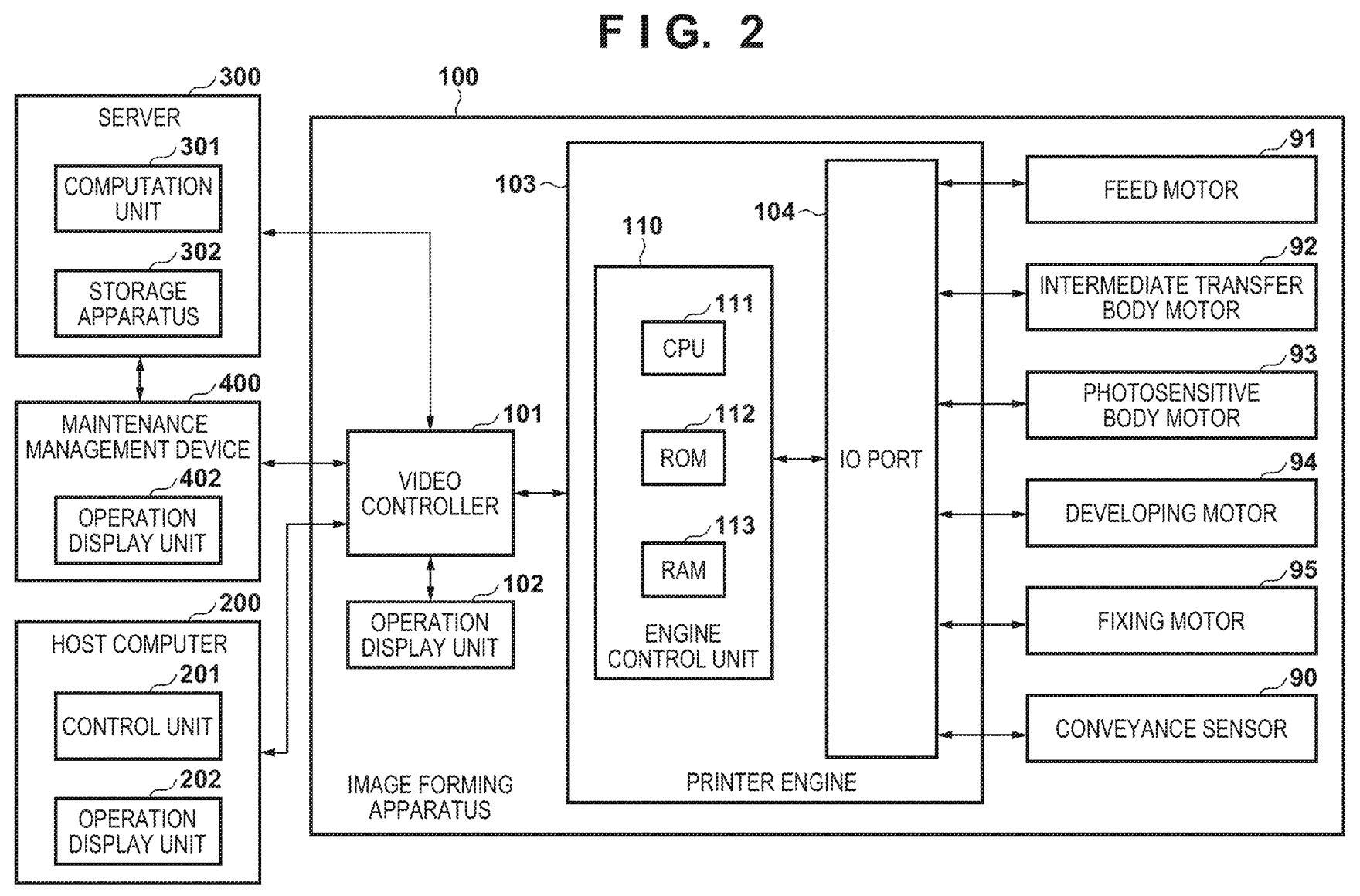

FIG. 2 is a diagram of a configuration of a diagnostic system or an image forming system including the image forming apparatus 100 according to the present embodiment. As illustrated in FIG. 2, a host computer 200, the image forming apparatus 100, a server 300 which is an information processing apparatus, and a maintenance management device 400 are configured so as to be capable of communicating with each other via a network, for example. A control unit 201 of the host computer 200 includes a CPU, which is a processor, and performs various processes by executing a control program stored in a storage apparatus (not illustrated). An operation display unit 202 includes a display, a keyboard, a mouse, and the like and provides a user interface. For example, the control unit 201 transmits a print job including image data to the image forming apparatus 100 in response to a user operation on the operation display unit 202 and thereby causes the image forming apparatus 100 to form an image based on the image data.

A video controller 101 of the image forming apparatus 100 can communicate with the host computer 200, the server 300, and the maintenance management device 400. When a print job is received from the host computer 200, the video controller 101 controls image formation which is based on that print job and performed by a printer engine 103. An operation display unit 102 includes an operation panel, an operation button, and the like and provides a user interface. The printer engine 103 includes an engine control unit 110, which includes a CPU 111 which is a processor, a ROM 112, and a RAM 113. The ROM 112 is a non-volatile memory for holding and storing control programs and various kinds of data. A rewritable non-volatile memory may be used instead of the ROM 112. The RAM 113 is a volatile memory that stores temporary data. The CPU 111 executes a control program stored in the ROM 112 and thereby controls respective units illustrated in FIG. 1 and respective motors 91 to 95 illustrated in FIG. 2 via an IO port 104 to form an image on a sheet S.

The feed motor 91 is a driving source of the feed roller 22, the conveyance roller 23 and the registration rollers 26. The intermediate transfer body motor 92 is a driving source of the driving roller 15. The photosensitive body motor 93 is a driving source of each photosensitive body 1. The developing motor 94 is a driving source of each developing roller 3. The fixing motor 95 is a driving source of the pressing roller 32 of the fixing unit 30 and the discharge rollers 41 of the discharge unit 40.

A computation unit 301 of the server 300 includes one or more processors (CPU) and performs various processes to be described below by executing a control program stored in a storage apparatus 302. The storage apparatus 302 includes arbitrary volatile and non-volatile storage devices. The storage apparatus 302 also stores data that the computation unit 301 uses in various processes in addition to the program that the computation unit 301 executes. In the present embodiment, the storage apparatus 302 is a component of the server 300, but some or all of data to be described below as being stored in the storage apparatus 302 may be stored in an external apparatus that can be accessed by the server 300 via a network.

The maintenance management device 400 is an information device, such as a smartphone, a tablet, or a personal computer that is used by a person in charge of maintenance management of the image forming apparatus 100, and includes an operation display unit 402, such as a touch display, in the present embodiment.

Figure 3:
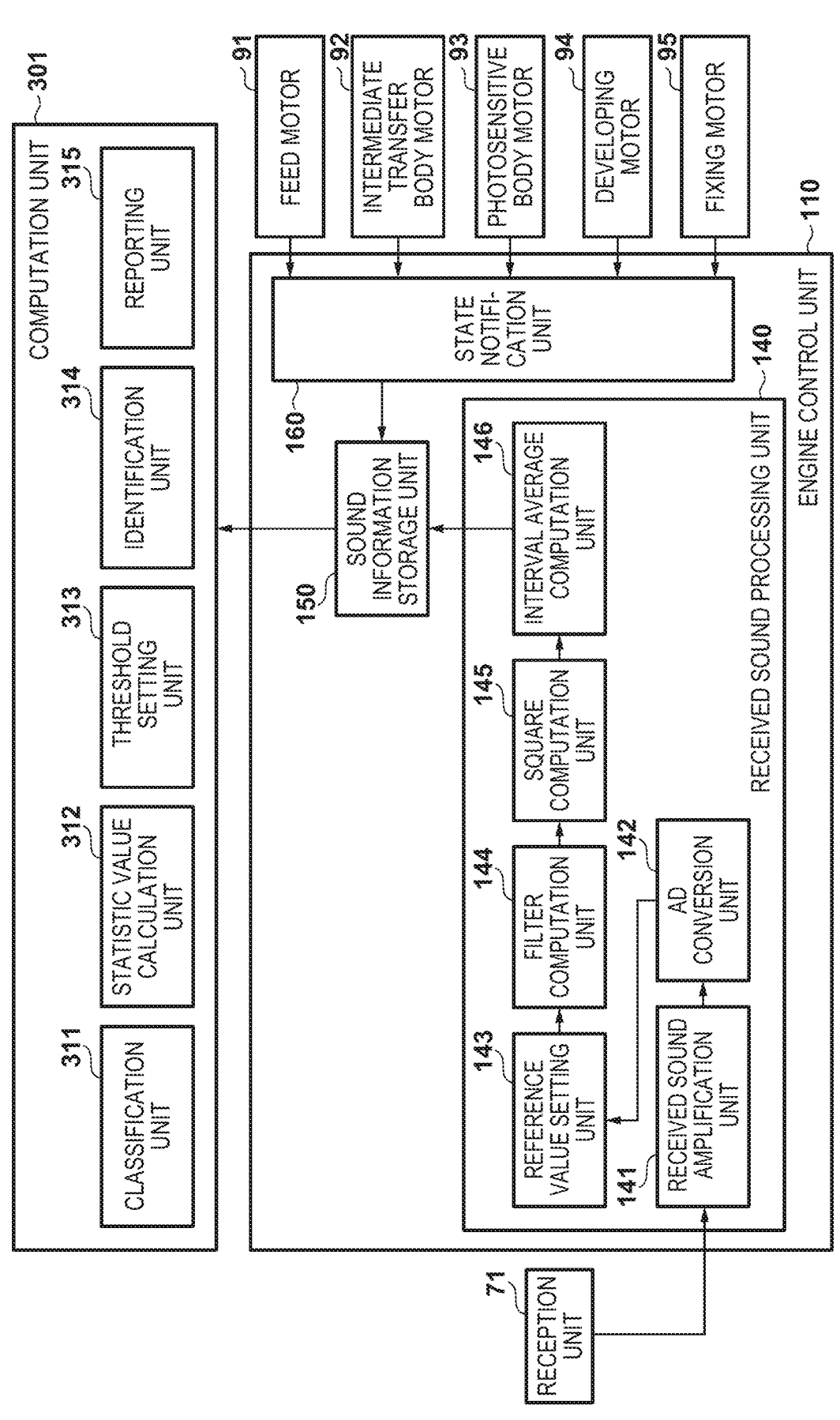
FIG. 3 is a functional block diagram of the diagnostic system according to some embodiments.

FIG. 3 is a functional block diagram of the computation unit 301, the engine control unit 110, and the server 300 illustrated in FIG. 2 according to the present embodiment. The functional blocks illustrated in FIG. 3 may be realized by the CPU 111 of the engine control unit 110 of the image forming apparatus 100 and the CPU of the computation unit 301 of the server 300 each executing a corresponding control program.

Upon receiving a print job, a received sound processing unit 140 processes a sound signal outputted by the reception unit 71, which has received a sound wave. A received sound amplification unit 141 amplifies the sound signal from the reception unit 71. An analog-to-digital (AD) conversion unit 142 converts the sound signal outputted by the received sound amplification unit 141 into a digital signal (digital values). Since the sound signal outputted by the reception unit 71 includes a direct current (DC) component, a reference value setting unit 143 subtracts a reference value from each digital value indicated by the digital signal from the AD conversion unit 142 and only extracts a component related to sound pressure variation. The reference value is set by the CPU 111.

A filter computation unit 144 performs filter processing by applying a filter to the digital signal from which the DC component has been removed in the reference value setting unit 143. The filter computation unit 144 holds a plurality of filters and performs the filter processing using a filter set by the CPU 111. A square computation unit 145 performs square computation of the post-filter processing digital signal. An interval average computation unit 146 performs interval average computation of the post-square computation digital signal. In the present embodiment, a time interval for which to perform interval average computation is set to be 100 ms as one example. A time length in which to perform interval average computation is not limited to 100 ms. Further, it is also possible to vary the time length in which to perform interval average computation for each measurement. By performing square computation and interval average computation, a sound wave level L indicating the magnitude of sound pressure fluctuation for a respective time interval is obtained. The interval average computation unit 146 stores the sound wave level L of each time interval in a sound information storage unit 150.

At this time, a state notification unit 160 determines the operation state of each motor 91 to 95, that is, whether it is operating, and associates the sound wave level L of a time interval with the operation state of each motor 91 to 95 in that time interval. In the following description, respective motors 91 to 95 will be collectively referred to as "actuators". The sound information storage unit 150 stores, for each time interval, information indicating the operation state of each actuator in that time interval and the sound wave level L in that time interval. When the operation state of an actuator changes in the middle of a time interval, the operation state with a longer operation time in that time interval, for example, is used. Hereinafter, information indicating a time interval, the operation state of each actuator in that time interval, and the sound wave level L in that time interval, which are stored in the sound information storage unit 150, will be referred to as sound data. One piece of sound data is information indicating, for each of a plurality of successive time intervals, the operation state of each actuator and the sound wave level L. In addition, one piece of sound data may be associated with print setting information, such as the type of a filter applied by the filter computation unit 144 and the type (or grammage) of a sheet S used for printing. In the present embodiment, sound data is thus generated in the image forming apparatus 100. The sound information storage unit 150 of the engine control unit 110 transmits the sound data to the server 300. The server 300 stores the sound data obtained from the image forming apparatus 100 in the storage apparatus 302.

Next, processing to be performed by the computation unit 301 of the server 300 will be described with reference to FIG. 3. A classification unit 311 classifies and adds, into a group, sound data stored in the storage apparatus 302. Grouping is performed based on a difference in the operation states of respective actuators in each of the plurality of time intervals between respective pieces of sound data. Specifically, a plurality of pieces of sound data for which the operation states of respective actuators in each of the plurality of time intervals are the same are grouped into the same group. Grouping may further be performed based on a filter applied at the time of generating sound data. In this case, even if there are two pieces of sound data for which the operation states of respective actuators in each of the plurality of time intervals are the same, for example, if filters applied at the time of generating the two pieces of sound data are different, the two pieces of sound data will belong to different groups. In addition, grouping may be performed based on print setting information. In this case, even if there are two pieces of sound data whose operation states of respective actuators in each of the plurality of time intervals are the same, for example, if the types of a sheet S conveyed at the time of obtaining the two pieces of sound data are different, the two pieces of sound data will belong to different groups.

As will be described later, a statistical value calculation unit 312 obtains, for each group, a statistical value P of each time interval based on a plurality of pieces of sound data in the same group. The processing to be described below is thus performed independently for each group. Therefore, in the following, even if a term "for each group" is omitted, assume that it means that the processing is performed independently for each group unless it is explicitly stated that it is not for each group. As will be described later, a threshold setting unit 313 sets a respective threshold TH-P for each time interval based on a respective statistical value P of each time interval. As will be described later, an identification unit 314 detects occurrence of an abnormal sound, that is, occurrence of a defect, by using the respective threshold TH-P for each time interval. In addition, when the occurrence of an abnormal sound is detected, the identification unit 314 identifies a causal part that is highly likely to be generating the abnormal sound. A reporting unit 315 reports information related to a result of identification by the identification unit 314. A reporting destination can be, for example, the maintenance management device 400, the host computer 200 used by a user of the image forming apparatus 100, or the image forming apparatus 100. A reporting destination device may display the contents of a report by the reporting unit 315 on the display of the operation display unit.

In the present embodiment, one piece of sound data is obtained in a period from a timing at which the last sheet S of one or more sheets S on which an image is to be formed in one print job has reached a predetermined position until after all the actuators of the image forming apparatus 100 have stopped. In the present embodiment, a timing at which a sheet S has reached the predetermined position is assumed to be a timing at which the trailing end of the sheet S has passed a position at which the sheet S is detected by the conveyance sensor 90. In addition, a length of a period for obtaining one piece of sound data is set to be 1600 ms. In the present embodiment, since the length of one time interval is 100 ms, one piece of sound data is data indicating the sound wave level L of each of 16 successive time intervals and the operation state of each actuator.

A period from a timing at which the trailing end of the last sheet S in one print job has passed the conveyance sensor 90 until all the actuators of the image forming apparatus 100 have stopped includes a period in which a sheet S is not being conveyed near the reception unit 71 and is a period in which the operation sound of each actuator of the image forming apparatus 100 is easily received. In the following description, the period from the timing at which the trailing end of the last sheet S has passed the conveyance sensor 90 until all the actuators of the image forming apparatus 100 have stopped will be referred to as a "post-rotation period". The period for obtaining sound data is not limited to the period described above. For example, if it is not necessary to reduce the load of processing for generating sound data by the image forming apparatus 100 or the processing load of the server 300 caused by an increase in the amount of data of sound data, a period from the start of feeding to the discharge of each sheet S may be set as the period for obtaining one piece of sound data.

FIG. 4 indicates processing for setting the threshold TH-P performed by the server 300. Upon obtaining one piece of sound data from the image forming apparatus 100, in step S10 the classification unit 311 determines a group to which that sound data belongs and stores that sound data in the storage apparatus 302 in association with the group to which that sound data belongs. As described above, grouping is performed according to a difference in the operation states of respective actuators over 16 time intervals. In addition, grouping is performed based on an applied filter and print setting information. FIGS. 5A and 5B illustrate two pieces of sound data classified into different groups based on the operation states of respective actuators. For a respective actuator of FIGS. 5A and 5B, "1" indicates that the actuator is operating (operating state) and "0" indicates that it is not operating (non-operating state). The sound data illustrated in FIG. 5A and the sound data illustrated in FIG. 5B are grouped into different groups, because the states of actuators in shaded portions in time interval #9 are different.

When new sound data is added to a group, in step S11 the statistical value calculation unit 312 obtains the statistical value P for each of 16 time intervals based on latest N pieces of sound data including the added sound data. The statistical value P can be, for example, a percentile value for N pieces of sound data. As one example, it is possible to set N=100 and the statistical value P to a 95th percentile value. In this case, when 16 time intervals of one piece of sound data are time interval #1 to time interval #16, the value of the fifth highest sound wave level L among 100 sound wave levels L in time interval #1 will be the statistical value P of time interval #1.

When the number of obtained statistical values P reaches M, in step S12 the threshold setting unit 313 sets a threshold TH-P for each of the 16 time intervals based on the M statistical values P. The threshold TH-P can be, for example, a value obtained by adding a predetermined value to an average value of M statistical values P. As one example, M can be 100. FIG. 6 illustrates an example of the sound wave levels L, the statistical values P determined from the sound wave levels L, and the threshold TH-P determined from the statistical values P. In FIG. 6, a value that is 10 dB greater than the average value of M statistical values P is set as the threshold TH-P. The threshold TH-P is thus determined based on M×N sound wave levels L.

The method of calculating the statistical value P is not limited to the above method. For example, the statistical value P can be an arbitrary percentile value or a maximum value of N sound wave levels L. Further, the statistical value P can be an average value of a predetermined number of N sound wave levels L from the top. Similarly, the method of setting the threshold TH-P is not limited to the above method. For example, the threshold TH-P can be set as an average value or a percentile value of M statistical values P increased using a predetermined method.

FIG. 7 is a flowchart of processing for determining whether an abnormal sound is occurring and the cause of the abnormal sound. The processing of FIG. 7 is executed after the threshold TH-P of each of the 16 time intervals are set. The classification unit 311 adds, into a group, sound data each time the sound data is inputted from the image forming apparatus 100, and the statistical value calculation unit 312 obtains the statistical value P corresponding to each of the 16 time intervals each time sound data is added to a group. The processing of FIG. 7 is executed after the statistical value calculation unit 312 calculates a new statistical value P. The statistical value P in the processing of FIG. 7 is based on sound data obtained by the server 300 after the threshold TH-P has been set and may be referred to as a "determination value P" when being distinguished from the statistical values P used to obtain the threshold TH-P.

In step S20, the identification unit 314 compares the newly-calculated statistical value P of each of the 16 time intervals with the threshold TH-P of a corresponding time interval. Then, the identification unit 314 determines that a time interval in which the statistical value P is greater than or equal to the threshold TH-P is an occurrence interval in which an abnormal sound is occurring and determines that other time intervals are non-occurrence intervals in which an abnormal sound is not occurring. Then, the identification unit 314 obtains an abnormal sound vector in which occurrence intervals are set to a value "1" and non-occurrence intervals are set to a value "0". The number of dimensions of the abnormal sound vector is equal to the number of time intervals and is 16 in this example. Further, the identification unit 314 obtains, for each actuator, an operation vector in which an interval in which the actuator is in an operating state is set to a value "1" and an interval in which the actuator is in a non-operating state is set to a value "0". The number of dimensions of the operation vector is equal to the number of time intervals and is 16 in this example. The values of the occurrence interval and the operating state interval are not limited to "1" so long as the values of the occurrence interval and the operating state interval are the same. Similarly, the values of the non-occurrence interval and the non-operating state interval are not limited to "0" so long as the values of the non-occurrence interval and the non-operating state interval are the same. In step S22, the identification unit 314 obtains an evaluation value of a similarity between the operation vector of each actuator and the abnormal sound vector. In this example, the evaluation value is a cosine value of an angle between the operation vector and the abnormal sound vector. That is, when the operation vector is A and the abnormal sound vector is B, the evaluation value is A·B/(|A||B|). Here, A·B is a dot product of vector A and vector B.

A high degree of similarity between the operation vector of an actuator and the abnormal sound vector means that the actuator and units driven by the actuator are highly likely to be the cause of the abnormal sound. Here, in this example, the higher the degree of similarity between the operation vector and the abnormal sound vector, the closer the evaluation value is to 1. Therefore, it is determined that an actuator whose evaluation value is close to 1 and units driven by that actuator are highly likely to be the cause of the abnormal sound. Therefore, in step S23, the identification unit 314 determines an actuator whose evaluation value is greater than or equal to a threshold. When the elements of the abnormal sound vector are all 0, that is, when all the time intervals are non-occurrence intervals, an abnormal sound is not occurring, and so, the identification unit 314 skips the processing of steps S21 to S23.

For example, assume that in the determination of step S20, it is determined that time interval #1 to time interval #13 are occurrence intervals and time interval #14 to time interval #16 are non-occurrence intervals. In this case, the abnormal sound vector is as illustrated in a "determination result" of FIG. 8. In addition, if the operating state of each actuator is the same as in FIG. 5A, the operation vector of each actuator is as illustrated in FIG. 8. Therefore, in this case, the evaluation values of the feed motor, the intermediate transfer body motor, the photosensitive body motor, the developing motor, and the fixing motor are 0.48, 0.78, 0.78, 0.78, and 1, respectively. When the threshold is set to 0.9, for example, it is identified that the fixing motor and units driven by the fixing motor are the cause of an abnormal sound. That is, the identification unit 314 determines that it is highly likely that one of the fixing unit 30 and the discharge unit 40 driven by the fixing motor, and the fixing motor and a fixing driving unit for transmitting the driving force thereof to the fixing unit 30 and the discharge unit 40 is the cause of the abnormal sound.

In the following description, the fixing unit 30 and the discharge unit 40 driven by the fixing motor, and the fixing motor and the fixing driving unit which includes a mechanism for transmitting the driving force thereof will be collectively referred to as a "fixing area". The fixing area collectively refers to a plurality of units (replaceable components) which are highly likely to be a causal part of an abnormal sound when the evaluation value of the fixing motor is greater than or equal to the threshold. Similarly, as illustrated in FIG. 9, a "feed area" is defined for the feed motor. The feed area includes the registration unit 25 driven by the feed motor and the feed motor and a feed driving unit that transmits the driving force thereof to the registration unit 25. The feed motor also transmits a driving force to the feed unit 20, but since the feed unit 20 is stopped at the start of the post-rotation period in the present embodiment, the feed unit 20 is excluded from the feed area. When sound data includes a period in which the feed unit 20 is driven, the feed unit 20 is included in the feed area. In addition, as illustrated in FIG. 9, one "image forming area" is defined for the intermediate transfer body motor 92, the photosensitive body motor 93, and the developing motor 94. This is because the cartridges 5 and the intermediate transfer body unit 11 driven by these motors operate in cooperation with each other. The image forming area includes the cartridges 5 and the intermediate transfer body unit 11, the intermediate transfer body motor 92, the photosensitive body motor 93 and the developing motor 94, and an image forming driving unit for transmitting driving forces of these motors.

As described above, in step S23, the identification unit 314 identifies a first area including a plurality of replaceable components that are highly likely to be a causal part of the defect based on the evaluation value of the respective motors. The first area is, for example, the feed area, the image forming area, the fixing area, or the like illustrated in FIG. 9.

The identification unit 314 identifies the first area that is highly likely to be the causal part of a defect and then further determines a second area including one or more units that are highly likely to be the cause of the defect (abnormal sound) among the plurality of units included in the identified first area based on abnormal sound data as illustrated in FIG. 10. The abnormal sound data is stored in advance in the storage apparatus 302 of the server 300. The abnormal sound data is information indicating, for each applied filter, a relationship between one or more units and an evaluation value for when an abnormal sound has occurred due to those units. The abnormal sound data may be information indicating, for each type of a sheet S or for each combination of an applied filter and a type of a sheet S, a relationship between one or more units and an evaluation value for when an abnormal sound has occurred due to those units. The abnormal sound data is prepared in advance based on experiments and abnormal sounds that have occurred in the past. First data of FIG. 10 indicates that when the evaluation value of the fixing motor for when a high-pass filter is used is greater than or equal to 0.9 and the evaluation value of the fixing motor for when a low-pass filter is used is less than 0.9, the discharge unit 40 is highly likely to be the cause. Similarly, second data of FIG. 10 indicates that when the evaluation value of the fixing motor is greater than or equal to 0.9 in both the high-pass filter and the low-pass filter, the fixing driving unit is highly likely to be the cause.

FIG. 11 is a flowchart of processing that the identification unit 314 executes using abnormal sound data in step S23 of FIG. 7. In step S30, the identification unit 314 determines an actuator whose evaluation value is greater than or equal to a threshold. In step S31, the identification unit 314 reads out abnormal sound data related to the actuator determined in step S30 from the storage apparatus 302. In step S32, the identification unit 314 compares the evaluation value of the actuator determined in step S30 for each filter with the abnormal sound data read in step S31. In step S33, the identification unit 314 determines the second area, which is the cause of the abnormal sound, based on a comparison result of step S32.

For example, assume that the evaluation value of the fixing motor for when the high-pass filter is used is 0.95, which is greater than or equal to the threshold, and the evaluation value of the fixing motor for when the low-pass filter is used is 0.5, which is less than the threshold. In addition, assume that the evaluation values of other motors are less than the threshold regardless of the filter used. Assume that the abnormal sound data is as illustrated in FIG. 10. In this case, the identification unit 314, in step S30, determines that the evaluation value of the fixing motor is greater than or equal to the threshold and, in step S32, compares the evaluation value of the fixing motor for when the low-pass filter is used and for when the high-pass filter is used with the abnormal sound data illustrated in FIG. 10. Since the evaluation values of the fixing motor coincides with No. 1 data of FIG. 10, the identification unit 314 identifies that the discharge unit 40 is most likely to be the cause of the abnormal sound.

The reporting unit 315 reports to the maintenance management device 400 such that the operation display unit 402 of the maintenance management device 400 displays an area that is likely to be a causal part of the abnormal sound identified by the identification unit 314.

For example, when the amount of sound data is small and the evaluation value for each filter has not been obtained, the identification unit 314 can identify the first area but cannot narrow it down to the second area based on the abnormal sound data. For example, when the identification unit 314 identifies the fixing area as the first area but does not identify the second area, the reporting unit 315 reports the "fixing area" as the causal part of the abnormal sound as illustrated in FIG. 12A. In response to the user selecting a portion indicating the "fixing area" of FIG. 12A, the reporting unit 315 can display replacement procedures for three units included in the "fixing area" on the operation display unit 402 as illustrated in FIG. 12B. Regarding the replacement procedures, a configuration may be taken such the order of replacement is designated. The order of replacement may be based on a predetermined priority.

Further, when collected sound data increases and the evaluation value for each filter is obtained, the identification unit 314 can narrow it down to the second area based on the abnormal sound data. For example, when the identification unit 314 identifies the fixing area as the first area and further identifies the discharge unit 40 as the second area, the reporting unit 315 can report the discharge unit 40 as the causal part of the abnormal sound as illustrated in FIG. 12C. In response to the user selecting a portion indicating the "discharge unit" of FIG. 12C, the reporting unit 315 can display a replacement procedure for the discharge unit 40 on the operation display unit 402, as illustrated in FIG. 12D. As illustrated in FIG. 12D, a screen indicating the replacement procedure for the discharge unit 40 includes a user operation region for displaying a screen indicating a replacement procedure for the fixing area when the abnormal sound does not stop even after the discharge unit 40 is replaced. In response to the user selecting a portion indicating the "fixing area" of FIG. 12D, the reporting unit 315 can display, on the operation display unit 402, replacement procedures for two units, which excludes the previously-displayed discharge unit 40, among the three units included in the "fixing area".

A configuration may be taken such that when the identification unit 314 identifies the second area, the reporting unit 315 not only reports the second area but both the first area and the second area. FIG. 12E illustrates an example of information reported to the maintenance management device 400 or the like when the fixing area is identified as the first area and the discharge unit 40 is identified as the second area. The order of display may be configured such that the discharge unit 40, which is highly likely to be the cause, is displayed so as to precede the fixing area. In response to the user selecting a portion indicating the "discharge unit" of FIG. 12E, the reporting unit 315 can display the replacement procedure for the discharge unit 40 on the operation display unit 402. In response to the user selecting a portion indicating the "fixing area" of FIG. 12E, the reporting unit 315 can display, on the operation display unit 402, replacement procedures for two units, which excludes the separately-displayed discharge unit 40, among the three units included in the "fixing area". Regarding the replacement procedures, a configuration may be taken such that the order of replacement is designated. In FIG. 12E, the discharge unit 40, which is highly likely to be the cause, is displayed so as to precede the fixing area, but a configuration may be taken such that information indicating that the discharge unit 40 be replaced precedingly is also displayed.

In the example of the abnormal sound data illustrated in FIG. 10, the second area is a single unit. However, there may be 2 or more units that are highly likely to be the cause under the same conditions. For example, when the evaluation value of the fixing motor for when the high-pass filter is used is greater than or equal to 0.9 and the evaluation value of the fixing motor for when the low-pass filter is used is less than 0.9, a possibility that either the discharge unit 40 or the fixing unit 30 is the cause is higher than a possibility that the fixing driving unit is the cause. In this case, the discharge unit and the fixing unit are indicated for the causal unit of the first data in FIG. 10. When the evaluation value coincides with the first data, the reporting unit 315 reports the discharge unit 40 and the fixing unit 30 as the second area. Therefore, the discharge unit 40 and the fixing unit 30 are displayed on the operation display unit 402 as illustrated in FIG. 12F. Further, a configuration may be taken so as to also report the order of replacement when the second area includes a plurality of replaceable units.

As described above, according to the present embodiment, the identification unit 314 collects data related to the operation of the image forming apparatus 100 from the image forming apparatus 100. In the present embodiment, the data related to the operation is data of operation sounds of the image forming apparatus 100. Then, upon detecting occurrence of a defect based on the collected data, the identification unit 314 identifies that a location of the defect is in the first area (first range), which includes a plurality of replaceable components, based on the data. When it can be identified that the location of the defect is in the second area (second range), which includes one or more replaceable components among the plurality of replaceable components included in the first area, based on the data, the identification unit 314 further identifies the second area. Then, when the identification unit 314 identifies the second area, the reporting unit 315 reports to the display apparatus such as the maintenance management device 400, for example, to display that there is a possibility of a defect in the second area. Further, when the identification unit 314 cannot identify the second area, the reporting unit 315 reports to a display apparatus such as the maintenance management device 400, to display that there is a possibility of a defect in the first area. With this configuration, it is possible to appropriately report replaceable components that are likely to be the causal part.

In the present embodiment, the server 300 operates as a diagnostic apparatus of the image forming apparatus 100. However, a configuration may be taken such that the processing described as being executed by the server 300 is executed by the engine control unit 110 of the image forming apparatus 100. That is, a configuration may be taken so as to arrange the computation unit 301 and the storage apparatus 302 included in the server 300 inside the image forming apparatus 100. Furthermore, a configuration may be taken so as to execute part of the processing that the received sound processing unit 140 executes, such as the processing performed by the functional blocks following the reference value setting unit 143, that is, the processing for generating sound data, in the server 300. In this case, the image forming apparatus 100 transmits a digital signal outputted by the AD conversion unit 142 together with information indicating the operation state of each actuator to the server 300. In the present embodiment, the server 300 is constituted by a single server apparatus, but the server 300 may be constituted by a plurality of servers.

An actuator may only include a motor but also a sensor, a solenoid, an electromagnetic clutch, and the like. Further, in the present embodiment, only one threshold TH-P has been set, but a configuration may be taken so as to set two levels of threshold TH-P and evaluate the abnormal sound level in three levels, which are "0", "1", and "2". The abnormal sound level "0" indicates that an abnormal sound is not occurring, and the abnormal sound levels "1" and "2" indicate that an abnormal sound is occurring. In this case, when sound data includes the abnormal sound level "2", the identification unit 314 identifies an actuator generating an abnormal sound by lowering the threshold to be compared with the evaluation value. With this, it is possible to more reliably identify the cause of the abnormal sound when a loud abnormal sound is occurring.

Second Embodiment

Next, a second embodiment will be described mainly on points of difference from the first embodiment. As illustrated in FIG. 1, the image forming apparatus 100 according to the present embodiment includes the image reading apparatus 501, the facing guide 502, and the discharge rollers 503 on the downstream side of the discharge rollers 41. A sheet S on which an image has been formed is sent from the discharge rollers 41 to the discharge rollers 503 and are discharged by the discharge rollers 503. During that time, the image reading apparatus 501 optically reads the sheet S and transmits read data indicating an image of the read sheet S to the storage apparatus 302 of the server 300. The read data may be RGB data indicating, for each pixel, red (R), green (G) and blue (B) luminance values.

Figure 13:
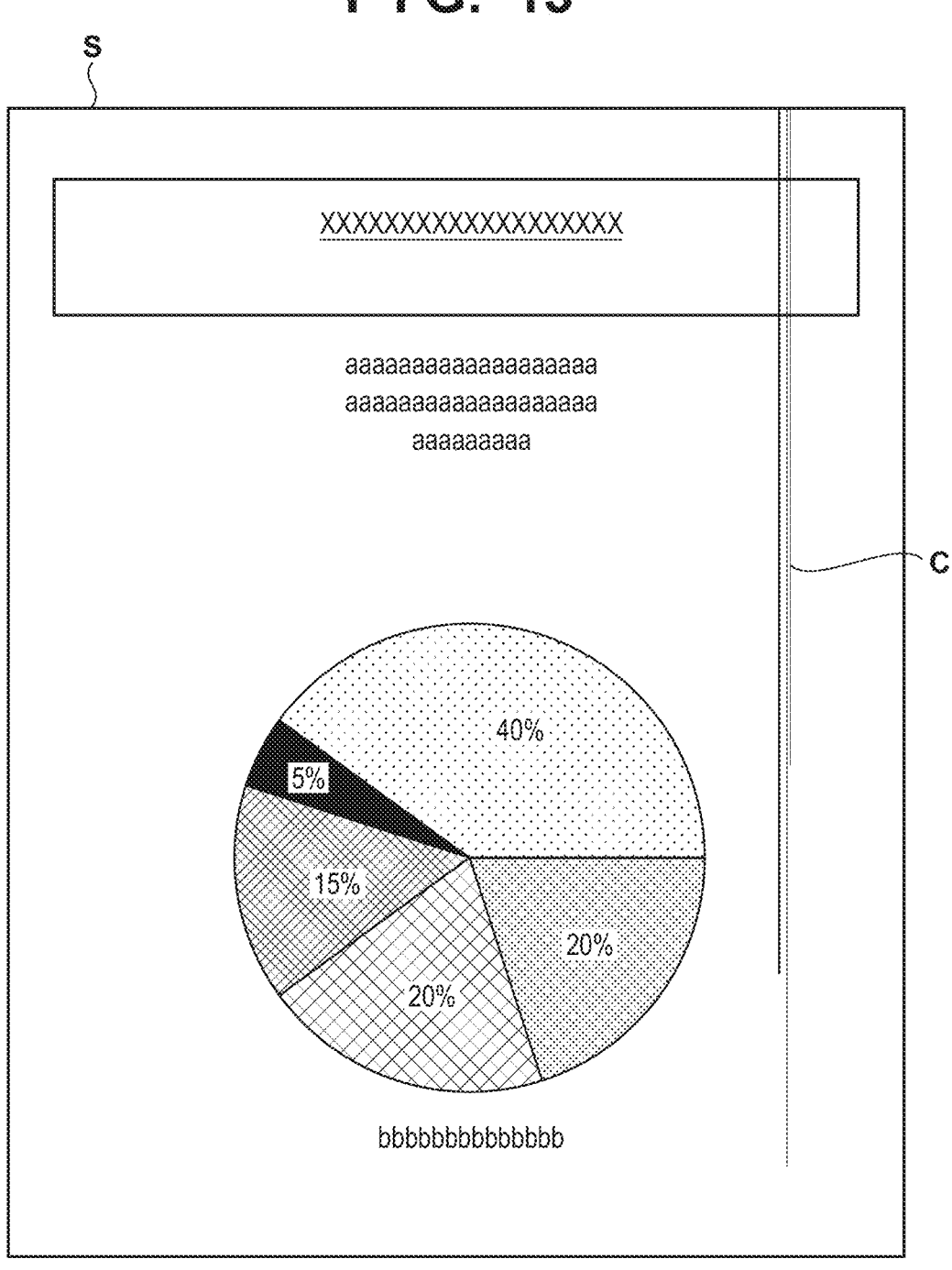
FIG. 13 is a diagram illustrating an example of an image defect according to some embodiments.

Next, a cleaning defect which is one of the image defects that occur in the image forming apparatus 100 will be described. The cleaning blade 4 removes toner remaining on the photosensitive body 1, and the cleaning blade 16 removes toner remaining on the intermediate transfer body 12. When removal of toner is no longer sufficiently performed due to deterioration of the cleaning blades 4 and 16 and the like, vertical streaks C, which are streaky image defects extending in the conveyance direction of a sheet S, are generated as illustrated in FIG. 13.

Figure 14:
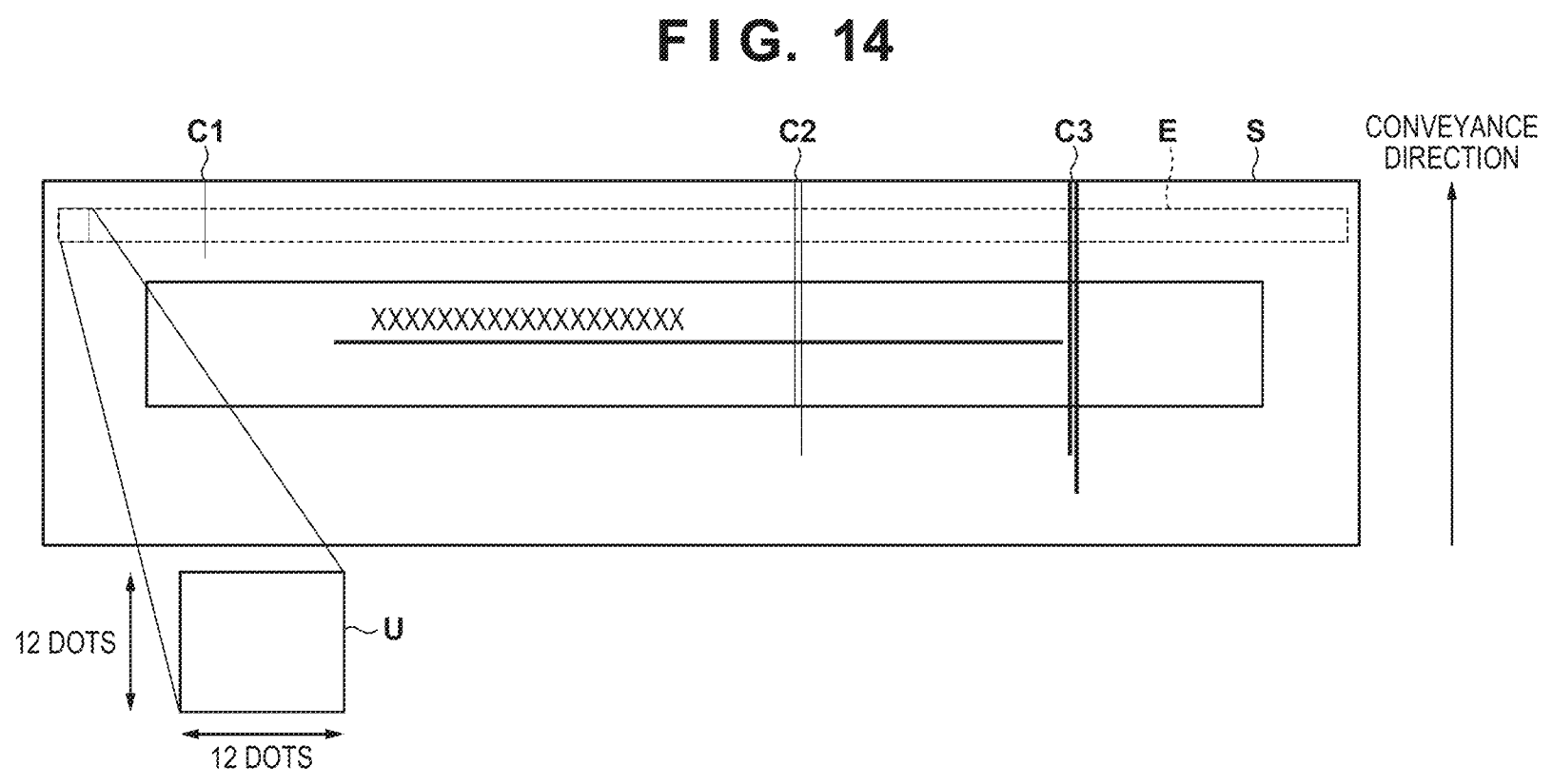

Next, processing for detecting an image defect will be described. FIG. 14 is an enlargement of a portion in which an image defect of a sheet S has occurred. Vertical streaks C1, C2, and C3 caused by a cleaning defect have occurred on the sheet S. Vertical streaks C1, C2, and C3 differ in their levels. Specifically, the level of vertical streak C1 is the lowest and the level of vertical streaks C3 is the highest. The higher the level of the vertical streak, the more visually perceivable by the user.

In the present embodiment, the image reading apparatus 501 reads a sheet S at a resolution of 100 dpi. A region to be read for determination of an image defect is a region E of FIG. 14, that is, a margin region (non-image region) on a leading end side in the conveyance direction of the sheet S. In the present embodiment, a length of the region E in the conveyance direction is set to be 3.05 mm (12 dots). A width of the region E, that is, a length in a direction (hereinafter, width direction) perpendicular to the conveyance direction depends on the size of the sheet. In the present embodiment, the width of the region E is set to be 209.05 mm.

The identification unit 314 of the server 300 obtains an average value of color information of each dot of the region E. In the present embodiment, color values of a Lab color space are used as the color information. Therefore, the identification unit 314 converts each color value of an RGB color space read by the image reading apparatus 501 into each color value of the Lab color space and then performs processing to be described below. Although the color values of the Lab color space are used in the present embodiment, the color values of an arbitrary color space can be used. In the following, average values of color values L, a, and b of the entire region E are denoted as $L_{ave}$, $a_{ave}$, $b_{ave}$, respectively.

As illustrated in FIG. 14, the identification unit 314 extracts a determination region U whose size is 3.05 mm×3.05 mm, that is, 12 dots×12 dots, from the region E. In the following description, the color values of each dot included in the determination region U are referred to as $L_{mn}$, $a_{mn}$, and $b_{mn}$. m is the order of the dot from an upper side (leading end side in the conveyance direction) to a lower side (trailing end side in the conveyance direction) of the determination region U, and n is the order of the dot from a left side to a right side of the determination region U in FIG. 14. For example, $L_{45}$ is a color value L of a dot that is fourth from the top and fifth from the left of the determination region U. In the following description, assume that a direction in which the value of m increases will be referred to as a vertical direction, and a direction in which the value of n increases will be referred to as a horizontal direction.

The identification unit 314 obtains a color difference $\Delta E_{mn}$ from the average value of the color information of the region E for each dot of the determination region U from $L_{mn}$, $a_{mn}$, and $b_{mn}$ according to Equation (1) below.

$$\Delta E_{mn} = \sqrt{((L_{mn}-L_{ave})^2+(a_{mn}-a_{ave})^2+(b_{mn}-b_{ave})^2)} \qquad (1)$$

Figures 15, 16:
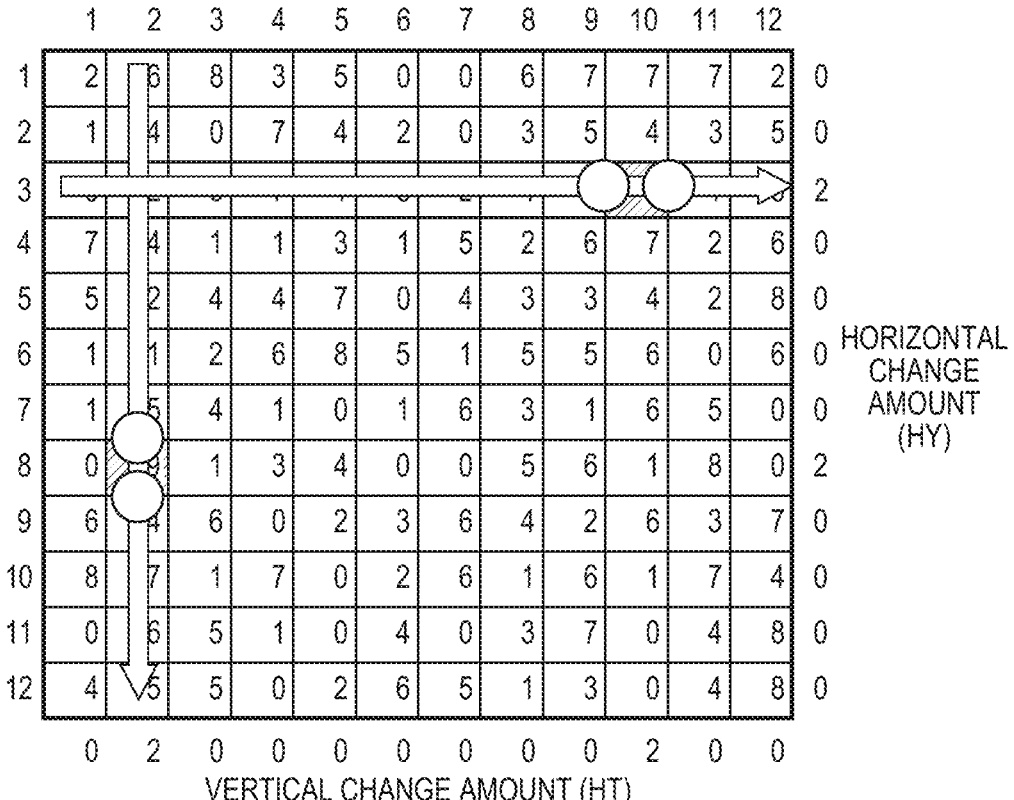
FIG. 15 is a descriptive diagram of processing for detecting an image defect according to some embodiments.
FIG. 16 is a descriptive diagram of processing for detecting an image defect according to some embodiments.

FIG. 15 illustrates the color difference $\Delta E_{mn}$ of each dot obtained for one determination region U. Values after the decimal point are omitted. Next, the identification unit 314 obtains a cumulative color difference value $\Delta E_{sum}$ obtained by accumulating the color difference $\Delta E_{mn}$ of all the 12×12 dots included in the determination region U. The identification unit 314 divides the cumulative color difference value $\Delta E_{sum}$ by 144, which is the total of number of dots in the determination region U, to obtain an average color difference value $\Delta E_{ave}$ in the determination region U. In the example of FIG. 15, the cumulative color difference value $\Delta E_{sum}$ is 515, and thus, the average color difference value $\Delta E_{ave}$ is 3.58.

The identification unit 314 sets a value obtained by adding a predetermined value to the average color difference value $\Delta E_{ave}$ as a threshold $\Delta E_{th}$. In the present embodiment, the predetermined value is 5, and therefore, the threshold $\Delta E_{th}$ is 3.58+5=8.58. The identification unit 314 compares the color difference $\Delta E_{mn}$ of each dot with the threshold $\Delta E_{th}$ and classifies each dot in the determination region U as a first dot or a second dot. In the present embodiment, a dot whose color difference $\Delta E_{mn}$ is greater than or equal to the threshold $\Delta E_{th}$ is classified as the first dot, and a dot whose color difference $\Delta E_{mn}$ is less than the threshold $\Delta E_{th}$ is classified as the second dot. In the example of FIG. 15, two shaded dots indicate the first dots, and other dots in white indicate the second dots. The first dot is determined to be a dot in which toner has adhered or a dot in which tiny bits of dust have adhered. That is, the second dot may be a normal dot and the first dot may be an abnormal dot.

In the present embodiment, for each of the 12 vertical dot columns, the number of changes from the first dot to the second dot and the number of changes from the second dot to the first dot in the vertical direction are counted, and a count value is obtained. Each dot column of the vertical dot columns includes a plurality of dots (12 in the present embodiment) arranged in the vertical direction. Assume that this count value will be referred to as a vertical change amount (HT) below. Counting is performed similarly for the 12 horizontal dot rows, and a count value is obtained as a horizontal change amount (HY). FIG. 16 illustrates the horizontal change amount and the vertical change amount obtained for the color differences $\Delta E_{mn}$ of FIG. 15. The identification unit 314 obtains a cumulative value $\Sigma HT$ (first count cumulative value) of 12 vertical change amounts and a cumulative value $\Sigma HY$ (second count cumulative value) of 12 horizontal change amounts. In the example of FIG. 16, $\Sigma HT=4$ and $\Sigma HY=4$. Further, in the present embodiment, a ratio of horizontal change amounts is defined as $RY=\Sigma HT/(\Sigma HT+\Sigma HY)$.

In addition, the level of an image defect is defined as $RI=RY\times\Delta E_{sum}$. The identification unit 314 shifts the determination region U to the right by a predetermined value and repeats the above-described processing. The predetermined value for shifting is shorter than the horizontal length of the determination region U and, in the present embodiment, is 2 mm. In the present embodiment, the horizontal length of the region E is 209.05 mm, and so, the above processing is repeated for a total of 103 determination regions U.

FIGS. 17A, 17B, and 17C respectively illustrate the color differences $\Delta E_{mn}$ and HT and HY of the determination region U including a portion in which vertical streaks C1, C2, and C3 of FIG. 14 are occurring. The shaded dots are the first dots whose color difference $\Delta E_{mn}$ is greater than or equal to the threshold $\Delta E_{th}$, and the other dots are the second dots. Since vertical streak C1 is a single streak, the color differences $\Delta E_{mn}$ of dots in one vertical column are greater than or equal to the threshold $\Delta E_{th}$ as illustrated in FIG. 17A. Meanwhile, since vertical streaks C2 and C3 are two streaks, the color differences $\Delta E_{mn}$ of dots in two vertical columns are greater than or equal to the threshold $\Delta E_{th}$ as illustrated in FIGS. 17B and 17C. Since vertical streaks C3 is higher in density of the streaks than vertical streaks C2, the color differences $\Delta E_{mn}$ of the first dots of FIG. 17C are larger than the color differences $\Delta E_{mn}$ of the first dots of FIG. 17B.

FIG. 18 illustrates a cumulative color difference value $\Delta E_{sum}$, $\Sigma HY$, $\Sigma HT$, RY, and RI obtained for each determination region U. #1 is the leftmost determination region U, #16 is a determination region U including vertical streak C1, #61 is a determination region U including vertical streaks C2, #79 is a determination region U including vertical streaks C3, and #103 is the rightmost determination region U.

From FIG. 18, it can be seen that a vertical streak occurrence level is correlated with the level RI. For example, there is no significant difference between the values of the horizontal change amount ratios RY of determination regions U #16, #61, and #79, which include vertical streaks C1 to C3. The value of the horizontal change amount ratio RY is greater for when a vertical streak is present than when a vertical streak is not present. Meanwhile, the cumulative color difference value $\Delta E_{sum}$ increases as the density of a vertical streak increases. Therefore, in general, the greater the level of a vertical streak, the greater the value of the level RI. For example, the identification unit 314 can determine that a region in which the level RI is greater than a predetermined value is a region in which a vertical streak is occurring and can determine that a region in which the level RI is less than or equal to the predetermined value is a region in which a vertical streak is not occurring. The predetermined value, for example, can be set to 500. Further, the identification unit 314 can determine that the greater the value of the level RI, the greater the level of a vertical streak that is occurring.

Further, in order to identify the color of a cleaning defect irrespective of the color of a sheet S, the identification unit 314 selects the determination region U with the smallest cumulative color difference value $\Delta E_{sum}$. In the following, assume that the determination region U #1 illustrated in FIG. 18 has been selected. This determination region U is a region in which there is little influence of toner or dust and which is thus suitable for being set as a reference color for the base of the sheet S. The identification unit 314 obtains average values $L_{white}$, $a_{white}$, $b_{white}$ of color values of dots of the determination region U #1.

The identification unit 314 keeps dots whose color difference $\Delta E_{mn}$ is greater than or equal to the threshold $\Delta E_{th}$, that is, the color values of the first dots, among dots of the determination region U #79 with the greatest level RI and erases the color values of the second dots. FIGS. 19A, 19B, and 19C illustrate states in which the above processing has been performed for the color value L, the color value a, and the color value b. The identification unit 314 subtracts the average value $L_{white}$ from the L value of each first dot (shaded dot) of FIG. 19A, subtracts the average value $a_{white}$ from the a value of each first dot of FIG. 19B, and subtracts the average value $b_{white}$ from the b value of each first dot of FIG. 19C. With this, information of the original color of a vertical streak, for which the color of the base of the sheet has been subtracted, can be obtained. The computation unit 301 analyzes a color component from the information of the original color of the vertical streak and identifies the color of the toner causing the vertical streak.

When the color of the toner causing the vertical streak is one color, the identification unit 314 determines that it is highly likely that the cartridge 5 corresponding to that one color is the causal part. Meanwhile, when the color of the toner causing the vertical streaks includes four colors, the identification unit 314 determines that it is highly likely that the intermediate transfer body unit 11 is the causal part. The reporting unit 315 reports to the maintenance management device 400 or the like that a vertical streak has occurred and a replaceable component that is highly likely to be the causal part.

For example, when the color of a vertical streak is yellow, the operation display unit 402 of the maintenance management device 400 displays information of FIG. 20A. Here, when a cleaning defect occurs in the intermediate transfer body 12, a vertical streak close to black occurs due to mixing of four colors of toner. Therefore, when the number of measurements is small, that is, when the amount of read data is small, the identification unit 314 cannot determine whether the cleaning defect is occurring in the intermediate transfer body 12 or in the black cartridge 5K. In such a case, the identification unit 314 identifies a black area including the intermediate transfer body unit 11 and the cartridge 5K as the first area that is highly likely to be the causal part. Then, the reporting unit 315 displays the black area on the operation display unit 402 of the maintenance management device 400 as illustrated in FIG. 20B. In response to the user selecting a portion indicating the "black area" of FIG. 20B, the reporting unit 315 can display replacement procedures for the two units included in the "black area" on the operation display unit 402 as illustrated in FIG. 20C.

Thereafter, when read data of sheets S increases and it is determined that the toner causing a vertical streak is the black toner or a mixed color of the four colors of toner, the identification unit 314 can determine whether a cleaning defect is occurring in the intermediate transfer body unit 11 or the cartridge 5K. In that case, the reporting unit 315 can display the second area, that is, either the intermediate transfer body unit 11 or the cartridge 5K, on the operation display unit 402 as illustrated in FIGS. 20D and 20E.

As described above, according to the present embodiment, the identification unit 314 collects data related to the operation of the image forming apparatus 100 from the image forming apparatus 100. In the present embodiment, the data related to the operation is read data of a sheet S on which the image forming apparatus 100 has formed an image. Then, upon detecting occurrence of a defect based on the collected data, the identification unit 314 identifies a location of a defect based on the data. Here, the identification unit 314 determines whether it is possible to identify that the location of the defect is in the second area (second range) based on the data. In the present embodiment, there are two second areas: the intermediate transfer body unit 11 and the cartridge 5K. When the second area cannot be identified, the identification unit 314 identifies the first area (black area) including the two second areas. The reporting unit 315, when the identification unit 314 has identified the second area, reports that there is a possibility of a defect in the second area and, when the second area cannot be identified, reports that there is a possibility of a defect in the first area. With this configuration, it is possible to appropriately report replaceable components that are likely to be the causal part.

Other Embodiments

In the first and second embodiments, the first area includes a plurality of replaceable components, and the second area related to the first area includes part of the replaceable components among the plurality of replaceable components included in the first area. That is, the second area is included in the first area. A configuration may be taken such that the first area not only includes a plurality of replaceable components but itself be one replaceable component. As one example, the fixing film 31 and the pressing roller 32 of the fixing unit 30 each are a replaceable component, but the fixing unit 30 itself is also one replaceable component. In such a case, the identification unit 314 may identify the fixing unit 30 as the first area and identify the fixing film 31 or the pressing roller 32 as the second area based on data collected from the image forming apparatus 100. In this case, when the second area cannot be identified, the reporting unit 315 may report the fixing unit 30 as the first area and report that the entire fixing unit 30 be replaced. Alternatively, when the second area cannot be identified, the reporting unit 315 may report the fixing unit 30 as the first area and report that the fixing film 31 and the pressing roller 32 be replaced in order and that if the defect is not solved, the entire fixing unit 30 be replaced.

Further, the first embodiment detects an abnormal sound as a defect, and the second embodiment detects an image defect as a defect, but a defect to be detected in the diagnostic system is not limited to abnormal sounds and image defects. For example, it is possible to collect a time from feeding of a sheet S until the conveyance sensor 90 detects the sheet S as data related to the operation of the image forming apparatus 100 and detect a feed and conveyance defect of a sheet S as a defect. In this case, since which of the feed roller 22, the conveyance roller 23, and the separation roller 24 is the cause cannot be distinguished based on the time, the identification unit 314 identifies the feed unit 20 as the first area, and the reporting unit 315 reports the feed unit 20. A configuration may be taken such that then when it is determined that there is a high possibility that paper powder or the like is adhered to the conveyance roller 23 and the separation roller 24 based on the data collected from the image forming apparatus 100, the conveyance roller 23 and the separation roller 24 are identified and reported as the second area.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-185012, filed Oct. 27, 2023, which is hereby incorporated by reference herein in its entirety.

What is claimed is:

1. An image forming system including an image forming apparatus and a server capable of communicating with the image forming apparatus, the image forming apparatus comprising one or more processors and one or more first memory devices configured to store one or more first programs, wherein the one or more first programs, when executed by the one or more first processors, cause the one or more first processors to function as:

a collection unit configured to collect data of operation sounds of the image forming apparatus; and a transmission unit configured to transmit the data to the server, wherein a plurality of replaceable components is in a first area in the image forming apparatus, and wherein the first area includes a plurality of second areas, each of the plurality of second areas including a replaceable component among the plurality of replaceable components in the first area, and the server comprising one or more second processors and one or more second memory devices configured to store one or more second programs, wherein the one or more second programs, when executed by the one or more second processors, cause the one or more second processors to function as:

an identification unit configured to detect a defect occurring in the image forming apparatus based on the data, identify that a location of the defect is in the first area based on the data, and in a case where it is possible to identify that the location of the defect is in a second area included in the first area based on the data after the location of the defect has been identified as being in the first area, further identify the second area; and a reporting unit configured to, in a case where the identification unit identifies the second area, report to a display apparatus such that the display apparatus displays information indicating that the defect is in the second area, and in a case where the identification unit does not identify the second area and identifies the first area, report to the display apparatus such that the display apparatus displays information indicating that the defect is in the first area.

2. The image forming system according to claim 1, wherein in a case where the identification unit does not identify the second area and identifies the first area, the reporting unit reports to the display apparatus such that the display apparatus displays an order of replacement of replaceable components included in the first area.

3. The image forming system according to claim 1, wherein in a case where the identification unit identifies the second area, the reporting unit reports to the display apparatus such that the display apparatus displays an order of replacement of replaceable components included in the second area.

4. The image forming system according to claim 1, wherein in a case where the identification unit identifies the second area, the reporting unit further reports to the display apparatus such that the display apparatus displays information indicating that the defect is in the first area.

5. The image forming system according to claim 4, wherein in a case where the identification unit identifies the second area, the reporting unit reports to the display apparatus such that the display apparatus displays an order of replacement of replaceable components included in the second area and an order of replacement of replaceable components included in the first area but not included in the second area.

6. The image forming system according to claim 1, wherein the first area includes the plurality of replaceable components and is also one replaceable component of the image forming apparatus.

7. The image forming system according to claim 6, wherein in a case where the identification unit does not identify the second area and identifies the first area, the reporting unit reports to the display apparatus such that the display apparatus displays that the one replaceable component is to be replaced, or the reporting unit reports to the display apparatus such that the display apparatus displays that in a case where the defect is not resolved even when the replaceable components included in the first area are replaced according to an order of replacement, the one replaceable component is to be replaced.

8. The image forming system according to claim 1, wherein the plurality of replaceable components included in the first area are driven by the same driving source.

9. The image forming system according to claim 1, wherein the plurality of replaceable components included in the first area include a replaceable component that forms a black image on a photosensitive body and transfers the black image to an intermediate transfer body and a replaceable component that includes the intermediate transfer body.

10. The image forming system according to claim 1, wherein the data is data indicating a relationship between an operation sound of the image forming apparatus and operation states of a plurality of driving sources included in the image forming apparatus.

11. The image forming system according to claim 10, wherein the defect detected by the identification unit is occurrence of an abnormal sound.

12. The image forming system according to claim 1, wherein the data is read data obtained by reading a sheet on which an image has been formed by the image forming apparatus.

13. The image forming system according to claim 12, wherein the defect detected by the identification unit is an image defect of the image formed on the sheet.

14. The image forming system according to claim 1, wherein a representation of the information indicating that the defect is in the first area is a general term of the plurality of second areas.

15. A diagnostic apparatus comprising one or more processors and one or more memory devices configured to store one or more programs, wherein the one or more programs, when executed by the one or more processors, cause the one or more processors to function as:

a collection unit configured to collect data of operation sounds of an image forming apparatus, wherein a plurality of replaceable components is in a first area in the image forming apparatus, and wherein the first area includes a plurality of second areas, each of the plurality of second areas including a replaceable component among the plurality of replaceable components in the first area; and an identification unit configured to detect a defect occurring in the image forming apparatus based on the data, identify that a location of the defect is in the first area, based on the data, and in a case where it is possible to identify that the location of the defect is in a second area included in the first area based on the data after the location of the defect has been identified as being in the first area, further identify the second area; and a reporting unit configured to, in a case where the identification unit identifies the second area, report to a display apparatus such that the display apparatus displays information indicating that the defect is in the second area, and in a case where the identification unit does not identify the second area and identifies the first area, report to the display apparatus such that the display apparatus displays information indicating that the defect is in the first area.

16. The diagnostic apparatus according to claim 15, wherein in a case where the identification unit does not identify the second area and identifies the first area, the reporting unit reports to the display apparatus such that the display apparatus displays an order of replacement of replaceable components included in the first area.

17. The diagnostic apparatus according to claim 15, wherein in a case where the identification unit identifies the second area, the reporting unit reports to the display apparatus such that the display apparatus displays an order of replacement of replaceable components included in the second area.

18. The diagnostic apparatus according to claim 15, wherein in a case where the identification unit identifies the second area, the reporting unit further reports to the display apparatus such that the display apparatus displays information indicating that the defect is in the first area.

19. The diagnostic apparatus according to claim 18, wherein in a case where the identification unit identifies the second area, the reporting unit reports to the display apparatus such that the display apparatus displays an order of replacement of replaceable components included in the second area and an order of replacement of replaceable components included in the first area but not included in the second area.

20. The diagnostic apparatus according to claim 15, wherein the first area includes the plurality of replaceable components and is also one replaceable component of the image forming apparatus.

21. An image forming apparatus comprising one or more processors and one or more memory devices configured to store one or more programs, wherein the one or more programs, when executed by the one or more processors, cause the one or more processors to function as:

a collection unit configured to collect data of operation sounds of the image forming apparatus, wherein a plurality of replaceable components is in a first area in the image forming apparatus, and wherein the first area includes a plurality of second areas, each of the plurality of second areas including a replaceable component among the plurality of replaceable components in the first area; and an identification unit configured to detect a defect occurring in the image forming apparatus based on the data, identify that a location of the defect is in the first area based on the data, and in a case where it is possible to identify that the location of the defect is in a second area included in the first area based on the data after the location of the defect has been identified as being in the first area, further identify the second area; and a reporting unit configured to, in a case where the identification unit identifies the second area, report to a display apparatus such that the display apparatus displays information indicating that the defect is in the second area, and in a case where the identification unit does not identify the second area and identifies the first area, report to the display apparatus such that the display apparatus displays information indicating that the defect is in the first area.

* * * * *